| (12) United States Patent<br>Boyer et al. | (10) Patent No.: US 9,680,858 B1<br>(45) Date of Patent: Jun. 13, 2017 |
|---|---|

(54) ANNOTATION PLATFORM FOR A SECURITY RISK SYSTEM

(71) Applicant: BitSight Technologies, Inc., Cambridge, MA (US)

(72) Inventors: Stephen Boyer, Cambridge, MA (US); Nagarjuna Venna, Waltham, MA (US); Philip John Steuart Gladstone, Carlisle, MA (US); Nicholas Whalen, Cambridge, MA (US)

(73) Assignee: Bitsight Technologies, Inc., Cambridge, MA (US)

( * ) Notice: Subject to any disclaimer, the term of this patent is extended or adjusted under 35 U.S.C. 154(b) by 0 days.

(21) Appl. No.: 15/134,845

(22) Filed: Apr. 21, 2016

Related U.S. Application Data

(63) Continuation-in-part of application No. 14/021,585, filed on Sep. 9, 2013, now Pat. No. 9,438,615.

(51) Int. Cl.
  *G06F 21/00* (2013.01)
  *H04L 29/06* (2006.01)

(52) U.S. Cl.
  CPC ................................ *H04L 63/1433* (2013.01)

(58) Field of Classification Search
  None
  See application file for complete search history.

(56) References Cited

U.S. PATENT DOCUMENTS

| 5,867,799 | A | 2/1999 | Lang et al. |
|---|---|---|---|
| 6,016,475 | A | 1/2000 | Miller et al. |
| 6,792,401 | B1 | 9/2004 | Nigro et al. |
| 7,100,195 | B1 | 8/2006 | Underwood |
| 7,194,769 | B2 | 3/2007 | Lippmann et al. |
| 7,290,275 | B2 | 10/2007 | Baudoin et al. |
| 7,748,038 | B2 | 6/2010 | Olivier et al. |
| 7,971,252 | B2 | 6/2011 | Lippmann et al. |
| 8,429,630 | B2 * | 4/2013 | Nickolov .............. G06F 9/4856 717/110 |
| 8,504,556 | B1 | 8/2013 | Rice et al. |
| 2001/0044798 | A1 | 11/2001 | Nagral et al. |
| 2002/0083077 | A1 | 6/2002 | Vardi |
| 2003/0050862 | A1 | 3/2003 | Bleicken et al. |

(Continued)

OTHER PUBLICATIONS

Hachem, Sara; Toninelli, Alessandra; Pathak, Animesh; Issany, Valerie. Policy-Based Access Control in Mobile Social Ecosystems. 2011 IEEE International Symposium on Policies for Distributed Systems and Networks (POLICY). http://ieeexplore.ieee.org/stamp/stamp.jsp?arnumber=5976796.*

(Continued)

*Primary Examiner* — Jeremiah Avery
(74) *Attorney, Agent, or Firm* — Goodwin Procter LLP

(57) ABSTRACT

Among other things, information is acquired and stored that is indicative of security risks associated with security subjects and with entities to which the security subjects belong. The stored information is analyzed by computer to derive security indicators for the entities. With respect to entities selected by the users, security information is presented by computer to users. The security information includes security indicators for the entities and security information for security subjects. The security information for security subjects includes annotations provided by users. The annotations are managed by computer based on communications from the users.

29 Claims, 25 Drawing Sheets

(56) References Cited

U.S. PATENT DOCUMENTS

| | | | |
|---|---|---|---|
| 2003/0123424 A1 | 7/2003 | Jung | |
| 2004/0010709 A1 | 1/2004 | Baudoin et al. | |
| 2004/0024859 A1 | 2/2004 | Bloch et al. | |
| 2004/0133561 A1 | 7/2004 | Burke | |
| 2004/0193918 A1 | 9/2004 | Green et al. | |
| 2004/0199791 A1* | 10/2004 | Poletto | H04L 12/2602 726/23 |
| 2004/0199792 A1* | 10/2004 | Tan | H04L 12/2602 726/12 |
| 2004/0221296 A1 | 11/2004 | Ogielski et al. | |
| 2004/0250122 A1* | 12/2004 | Newton | H04L 63/1425 726/2 |
| 2004/0250134 A1* | 12/2004 | Kohler, Jr. | H04L 63/1425 726/23 |
| 2005/0071450 A1 | 3/2005 | Allen et al. | |
| 2005/0080720 A1 | 4/2005 | Betz et al. | |
| 2005/0108415 A1 | 5/2005 | Turk et al. | |
| 2005/0131830 A1 | 6/2005 | Juarez et al. | |
| 2005/0138413 A1 | 6/2005 | Lippmann et al. | |
| 2006/0173992 A1* | 8/2006 | Weber | H04L 63/1425 709/224 |
| 2006/0212925 A1* | 9/2006 | Shull | G06F 21/55 726/1 |
| 2007/0143851 A1* | 6/2007 | Nicodemus | G06F 21/55 726/25 |
| 2007/0282730 A1 | 12/2007 | Carpenter et al. | |
| 2008/0047018 A1 | 2/2008 | Baudoin et al. | |
| 2008/0140495 A1 | 6/2008 | Bhamidipaty et al. | |
| 2008/0162931 A1 | 7/2008 | Lord et al. | |
| 2008/0209565 A2 | 8/2008 | Baudoin et al. | |
| 2009/0044272 A1 | 2/2009 | Jarrett | |
| 2009/0193054 A1 | 7/2009 | Karimisetty et al. | |
| 2009/0265787 A9 | 10/2009 | Baudoin et al. | |
| 2009/0293128 A1 | 11/2009 | Lippmann et al. | |
| 2010/0262444 A1 | 10/2010 | Atwal et al. | |
| 2011/0185403 A1 | 7/2011 | Dolan et al. | |
| 2012/0158725 A1* | 6/2012 | Molloy | G06F 17/30563 707/737 |
| 2012/0166458 A1 | 6/2012 | Laudanski et al. | |
| 2014/0108474 A1* | 4/2014 | David | G06F 17/30 707/827 |
| 2014/0204803 A1 | 7/2014 | Nguyen et al. | |
| 2015/0074579 A1 | 3/2015 | Gladstone et al. | |
| 2015/0310188 A1* | 10/2015 | Ford | G06F 21/10 726/28 |

OTHER PUBLICATIONS

Srivastava, Divesh; Velegrakis, Yannis. Using Queries to Associate Metadata with Data. IEEE 23rd International Conference on Data Engineering. Pub. Date: 2007. http://ieeexplore.ieee.org/stamp/stamp.jsp?arnumber=4221823.*
Edmonds, Robert, "ISC Passive DNS Architecture", Internet Systems Consortium, Inc., Mar. 2012, 18 pages.
Computer Network Graph—Bees, http://bioteams.com/2007/04/30/visualizing_complex_networks.html, date accessed Sep. 28, 2016.
Computer Network Graph—Univ. of Michigan, http://people.cst.cmich.edu/liao1q/research.shtml, date accessed Sep. 28, 2016.
Hacking Exposed 6, S. McClure et al., copyright 2009, 37 pages.
MaxMind, https://www.maxmind.com/en/about-maxmind, https://www.maxmind.com/en/geoip2-isp-database, date accessed Sep. 28, 20116, 3 pages.
Netcraft, www.netcraft.com, date accessed Sep. 28, 2016, 2 pages.
NetScanTools Pro, http://www.netscantools.com/nstpromain.html, date accessed Sep. 28, 2016, 2 pages.
Network Security Assessment, C. McNab, copyright 2004, 13 pages.
RFC 781, https://tools.ietf.org/html/rfc781, date accessed Sep. 28, 2016, 3 pages.
RFC 950, https://tools.ietf.org/html/rfc950, date accessed Sep. 28, 2016, 19 pages.
RFC 954, https://tools.ietf.org/html/rfc954, date accessed Sep. 28, 2016, 5 pages.
RFC 1834, https://tools.ietf.org/html/rfc1834, date accessed Sep. 28, 2016, 7 pages.
SamSpade Network Inquiry Utility, https://www.sans.org/reading-room/whitepapers/tools/sam-spade-934, date accessed Sep. 28, 2016, 19 pages.
Snort Intrusion Monitoring System, http://archive.oreilly.com/pub/h/1393, date accessed Sep. 28, 2016, 3 pages.
Wikipedia, https://en.wikipedia.org/wiki/Crowdsourcing, date accessed Sep. 28, 2016.
SBIR Phase I: Enterprise Cyber Security Scoring, CyberAnalytix, LLC, http://www.nsf.gov/awardsearch/showAward.do?AwardNumber=I013603, Apr. 28, 2010, 2 pages.
"Twenty Critical Controls for Effective Cyber Defense: Consensus Audit," Version 2.3, Nov. 13, 2009, retrieved on Apr. 9, 2010 from http://www.sans.org/critical-security-controls/print.php.
"An Executive View ofIT Governance," IT Governance Institute, 2009, 32 pages.
Lippmann, RP., et al., "An Annotated Review of Papers on Attack Graphs," Project Report IA-1, Lincoln Laboratory, Massachusetts Institute of Technology, Mar. 31, 2005, 39 pages.
Artz, Michael Lyle, "NetSPA: A Network Security Planning Architecture," Massachusetts Institute of Technology, May 24, 2002, 97 pages.
Nye, John, "Avoiding Audit Overlap," Moody's Risk Services, Presentation, Source Boston, Mar. 14, 2008, 19 pages.
"Agreed Upon Procedures," Version 4.0, BITS, The Financial Institution Shared Assessments Program, Assessment Guide, Sep. 2008, 56 pages.
"Master Security Criteria," Version 3.0, BITS Financial Services Security Laboratory, Oct. 2001, 47 pages.
The Financial Institution Shared Assessments Program, Industry Positioning and Mapping Document, BITS, Oct. 2007, 44 pages.
Browne, Niall, et al., "Shared Assessments Program AUP and SAS70 Frequently Asked Questions," Bits, 4 pages.
"Shared Assessments: Getting Started," BITS, 2008, 4 pages.
Boyer, Stephen, et al., Playing with Blocks: SCAP-Enable Higher-Level Analyses, MIT Lincoln Laboratory, 5th Annual IT Security Automation Conference, Oct. 26-29, 2009, 35 pages.
Buckshaw, Donald L., "Use of Decision Support Techniques for Information System Risk Management," submitted for publication in Wiley's Encyclopedia of Quantitative Risk Assessment in Jan. 2007, 11 pages.
Buehler, Kevin S., et al., "Running with risk," The McKinsey Quarterly, No. 4, 2003, pp. 40-49.
Chu, Matthew, et al., "Visualizing Attack Graphs, Reachability, and Trust Relationships with Navigator," MIT Lincoln Library, VizSEC '10, Ontario, Canada, Sep. 14, 2010, 12 pages.
The CIS Security Metrics v1.0.0, The Center for Internet Security, May 11, 2009, 90 pages.
Method Documentation, CNSS Risk Assessment Tool Version 1.1, Mar. 31, 2009, 24 pages.
Crowther, Kenneth G., et al., "Principles for Better Information Security through More Accurate, Transparent Risk Scoring," Journal of Homeland Security and Emergency Management, vol. 7, Issue 1, Article 37, 2010, 20 pages.
"Assuring a Trusted and Resilient Information and Communications Infrastructure," Cyberspace Policy Review, May 2009, 76 pages.
Davis, Lois M., et al., "The National Computer Security Survey (NCSS) Final Methodology," Technical report prepared for the Bureau of Justice Statistics, Safety and Justice Program, RAND Infrastructure, Safety and Environment (ISE), 2008, 91 pages.
Dillon-Merrill, PhD., Robin L, et al., "Logic Trees: Fault, Success, Attack, Event, Probability, and Decision Trees," Wiley Handbook of Science and Technology for Homeland Security, 13 pages.
Dun & Bradstreet, The DUNSRight Quality Process: Power Behind Quality Information, 24 pages.
Dun & Bradstreet Corp. Stock Report, Standard & Poor's, Jun. 6, 2009, 8 pages.
Equifax Inc. Stock Report, Standard & Poor's, Jun. 6, 2009, 8 pages.
The Fair Credit Reporting Act (FCRA) of the Federal Trade Commission (FTC), Jul. 30, 2004, 86 pages.

(56) References Cited

OTHER PUBLICATIONS

Report to the Congress on Credit Scoring and Its Effects on the Availability and Affordability of Credit, Board of Governors of the Federal Reserve System, Aug. 2007, 304 pages.
Stone-Gross, Brett, et al., "FIRE: Finding Rogue Networks," 10 pages.
Ingols, Kyle, et al., "Modeling Modern Network Attacks and Countermeasures Using Attack Graphs," MIT Lincoln Laboratory, 16 pages.
Ingols, Kyle, et al., "Practical Attack Graph Generation for Network Defense," MIT Lincoln Library, IEEE Computer Society, Proceedings of the 22nd Annual Computer Security Applications Conference (ACSAC'06), 2006, 10 pages.
Ingols, Kyle, et al., "Practical Experiences Using SCAP to Aggregate CND Data," MIT Lincoln Library, Presentation to NIST SCAP Conference, Sep. 24, 2008, 59 pages.
Johnson, Eric, et al., "Information Risk and the Evolution of the Security Rating Industry," Mar. 24, 2009, 27 pages.
Lippmann, RP., et al., "Evaluating and Strengthening Enterprise Network Security Using Attack Graphs," Project Report IA-2, MIT Lincoln Laboratory, Oct. 5, 2005, 96 pages.
"Assessing Risk in Turbulent Times," A Workshop for Information Security Executives, Glassmeyter/McNamee Center for Digital Strategies, Tuck School of Business at Dartmouth, Institute for Information Infrastructure Protection, 2009, 17 pages.
Lippmann, Richard, et al., "Validating and Restoring Defense in Depth Using Attack Graphs," MIT Lincoln Laboratory, 10 pages.
"Plugging the Right Holes," Lab Notes, MIT Lincoln Library, Posted Jul. 2008, retrieved Sep. 14, 2010 from http://www.11.miI.edufpublicationsflabnotesfpluggingtherightho! . . . , 2 pages.
Rare Events, Oct. 2009, JASON, The MITRE Corporation, Oct. 2009, 104 pages.
Lippmann, Rich, et al., NetSPA: a Network Security Planning Architecture, MIT Lincoln Laboratory, 11 pages.
Proposal and Award Policies and Procedures Guide, Part I—Proposal Preparation & Submission Guidelines GPG, The National Science Foundation, Feb. 2009, 68 pages.
Paxson, Vern, "How The Pursuit of Truth Led Me to Selling Viagra," EECS Department, University of California, International Computer Science Institute, Lawrence Berkeley National Laboratory, Aug. 13, 2009, 68 pages.
"Report on Controls Placed in Operation and Test of Operating Effectiveness," EasCorp, Jan. 1 through Dec. 31, 2008, prepared by Crowe Horwath, 58 pages.
Taleb, Nassim N., et al., "The Six Mistakes Executives Make in Risk Management," Harvard Business Review, Oct. 2009, 5 pages.
2009 Data Breach Investigations Report, study conducted by Verizon Business RISK Team, 52 pages.
Williams, Leevar, et al., "GARNET: A Graphical Attack Graph and Reachability Network Evaluation Tool," MIT Lincoln Library, VizSEC 2009, pp. 44-59.
Williams, Leevar, et al., "An Interactive Attack Graph Cascade and Reachability Display," MIT Lincoln Laboratory, 17 pages.

* cited by examiner

FIG. 7

BITSIGHT   PORTFOLIO ▾   MY COMPANY   ALERTS   🔍 Search Companies   🚩 ⓘ ⚙▾

▸ Overview   Rating Details   Events   Diligence   User Behavior   My Infrastructure   Forensics

| IP ADDRESSES | DOMAINS | TAGS |

The following table lists details for CIDR blocks   📄 Download IP Address Data
attributed to your company and its subsidiaries.

( REPORT MISSING IP ADDRESSES )

( Search 🔍 ) ☐ Active CIDR Blocks only    ☐ Hide subsidiary CIDRs

Filter By Tags   ⟨☑ Corporate Network ✕⟩   ⟨☑ Guest Wifi ✕⟩ ◂—231

| FILTER BY: | nberⓘ Countryⓘ Start Dateⓘ End Dateⓘ Attributed Toⓘ IP Countⓘ Feedback |
| 🔍 | |
| ⟨ Retail Location⟩ | —267               Saperix, Inc.              ⋯ |
| ⟨ Subsidiary - In⟩ | —233 |
|                    | —269 |
| ⟨☑ Corporate Wifi⟩ | US  01-01-2011  active  Saperix, Inc.   256   ⋯ |

Showing 1 to 2 of 2 entries (filtered from 13 total entries)

| Type | IP Address | Start | End | Days | Details | |
|---|---|---|---|---|---|---|
| Potentially Exploited<br>Subsidiary - int. | 24.6.18.168 | 03-23-2016 | 03-27-2016 | 5 | Infection: Genieo | Details ˅ |
| Botnet Infections<br>Subsidiary - int. | 24.6.25.9 | 03-21-2016 | 03-27-2016 | 7 | Infection: Conficker | Details ˅ |
| Botnet Infections<br>Subsidiary - int. | 24.6.25.9 | 03-21-2016 | 03-26-2016 | 6 | Infection: Conficker | Details ˅ |
| Botnet Infections<br>Subsidiary - int. | 24.6.28.217 | 03-26-2016 | 03-26-2016 | 1 | Infection: Maazben | Details ˅ |
| Botnet Infections<br>Subsidiary - int. | 24.6.29.144 | 02-15-2016 | 03-26-2016 | 41 | Infection: Chebri | Details ˅ |
| Botnet Infections<br>Subsidiary - int. | 24.6.29.178 | 03-26-2016 | 03-26-2016 | 1 | Infection: Alureon | Details ˅ |
| Botnet Infections<br>Subsidiary - int. | 24.6.20.144 | 03-25-2016 | 03-25-2016 | 1 | Infection: Viknok | Details ˅ |
| Potentially Exploited<br>Subsidiary - int. | 24.6.19.130 | 03-15-2016 | 03-23-2016 | 9 | Infection: Defaulttab | Details ˅ |
| Potentially Exploited | 24.12.168.91 | 01-06-2016 | 03-22-2016 | 77 | Infection: Grayware | Details ˅ |
| Botnet Infections | 24.6.20.144 | 03-06-2016 | 03-20-2016 | 15 | Infection: Viknok | Details ˅ |

Filter By Tags — 273
COLLAPSE ALL EXPAND ALL — 275

FIG. 11B

| | | | | | | | |
|---|---|---|---|---|---|---|---|
| 03-24-2016 | 03-27-2016 | ✓ | 24.6.20.84:1900 [Subsidiary - int.] | Open Ports | NEUTRAL | Detected service: HTTP | 🔍 |
| 12-23-2016 | 03-27-2016 | ✓ | 24.6.27.23:81 [Subsidiary - int.] | Open Ports | NEUTRAL | Detected service: HTTP | 🔍 |
| 03-07-2016 | 03-27-2016 | ✓ | 24.12.169.211:3389 1 PAST EVENT⌄ | Open Ports | WARN | Typical service: MS RDP | 🔍 |
| 02-28-2016 | 03-27-2016 | ✓ | 24.6.19.126:7547 [Subsidiary - int.] | Open Ports | NEUTRAL | Detected service: HTTP | 🔍 |
| 10-03-2015 | 03-27-2016 | ✓ | 24.6.16.153:7547 [Subsidiary - int.] | Open Ports | NEUTRAL | Detected service: HTTP | 🔍 |
| 03-12-2016 | 03-27-2016 | ✓ | 24.6.26.132:8181 [Subsidiary - int.] | Open Ports | GOOD | Detected service: HTTPS | 🔍 |
| 03-19-2016 | 03-27-2016 | ✓ | 24.6.19.192:443 1 PAST EVENT⌄ [Subsidiary - int.] | Application Security | BAD | No security headers are set | ⊙ 🔍 |
| 03-19-2016 | 03-27-2016 | ✓ | 24.6.19.192:443 1 PAST EVENT⌄ [Subsidiary - int.] | Open Ports | GOOD | Detected service: HTTPS | 🔍 |
| 03-19-2016 | 03-27-2016 | ✓ | 24.6.19.192:443 1 PAST EVENT⌄ [Subsidiary - int.] | SSL Configurations | BAD | Diffie-Hellman prime is less than 2048 bits. Short Diffie-Hellman prime is very commonly used | ⊙ 🔍 |
| 03-19-2016 | 03-27-2016 | ✓ | www.dlink.com | SSL Certificates | BAD | Self-signed certificate. Insecure signature algorithm: SHA1 | ⊙ 🔍 |
| 03-04-2016 | 03-27-2016 | ✓ | 24.6.30.245:21 [Subsidiary - int.] | Open Ports | NEUTRAL | Typical service: FTP | 🔍 |
| 11-17-2015 | 03-27-2016 | ✓ | 24.6.19.65:554 [Subsidiary - int.] | Open Ports | WARN | Detected service: RTSP | 🔍 |
| 11-20-2015 | 03-27-2016 | ✓ | 24.6.17.26:7547 [Subsidiary - int.] | Open Ports | NEUTRAL | Detected service: HTTP | 🔍 |

FIG. 13B

| | | | | | | | | |
|---|---|---|---|---|---|---|---|---|
| 03-05-2016 | 03-27-2016 | ✓ | saperbc.com 2 PAST EVENTS ⌄ | | DNSSEC | NEUTRAL | DNSSEC is not configured on this Domain | ↻ 🔍 |
| 03-22-2015 | 03-27-2016 | ✓ | 24.6.19.127:7547 ⟨Subsidairy - int.⟩ | | Open Ports | NEUTRAL | Detected service: HTTP | 🔍 |
| 08-10-2015 | 03-27-2016 | ✓ | 24.6.25.58:554 ⟨Subsidairy - int.⟩ | | Open Ports | WARN | Detected service: RTSP | 🔍 |
| 02-26-2016 | 03-27-2016 | ✓ | 24.6.16.226:7547 ⟨Subsidairy - int.⟩ | | Open Ports | NEUTRAL | Detected service: HTTP | 🔍 |
| 03-09-2016 | 03-27-2016 | ✓ | 24.6.16.37:7547 ⟨Subsidairy - int.⟩ | | Open Ports | NEUTRAL | Detected service: HTTP | 🔍 |
| 01-15-2016 | 03-27-2016 | ✓ | 24.6.18.54:7547 1 PAST EVENT ⌄ ⟨Subsidairy - int.⟩ | | Open Ports | NEUTRAL | Detected service: HTTP | 🔍 |

Showing 1 to 20 of 643 entries*
(filtered from 1,407 total entries)      First | Previous | 1 | 2 | 3 | 4 | 5 | • • • | 33 | NEXT | LAST
*This is a representative sample of all 5,626 observed records.
Note: Records older than sixty days will not affect a company's Security Rating.

FIG. 13C

| BITSIGHT | PORTFOLIO ⌄ | MY COMPANY | ALERTS | 🔍 Search Companies | 🏁 ⓘ ⚙⌄ |

| Overview | Rating Details | Events | Diligence | User Behavior | My Infrastructure | Forensics |

Saperix, Inc.
🔗 Technology
🏠 Saperix.com
🌐 5,786 IP addresses
👤 615 searches

BITSIGHT SECURITY RATING
360 ( COMPARE )

📄 Download this Security Ratings report ( 📁 ADD TO )
( 📁 VIEW SERVICE PROVIDERS )

Folders: All Companies

---

USER BEHAVIOR DETAILS FOR SAPERIX, INC.                              📄 Download user behavior data

FILE SHARING CATEGORY DISTRIBUTION
File Sharing events indicate the number of times in the past 60 days that file sharing activity occurred within a company's infrastructure, sorted by torrent category. Each event represents one IP address sharing one torrent per day.

(F) IN THE BOTTOM 10% OF ALL COMPANIES
GRADE
/
336

FILE SHARING - 587 EVENTS OVER THE PAST 60 DAYS
132 UNIQUE IPS OBSERVED

```
                        369
EVENT VOLUME                           ┌338
          61        14     16                    38        89
         ▓▓▓▓      ▓▓    ▓▓▓▓    ▓▓▓▓▓▓▓▓    ▓▓▓    ▓▓▓▓▓▓    0
      APPLICATIONS  Books  GAMES    MOVIES    MUSIC     TV     OTHER
      37 Unique Torrents 10 Unique Torrents 9 Unique Torrents 228 Unique Torrents 14 Unique Torrents 85 Unique Torrents 0 Unique Torrents
      26 Unique IPs  6 Unique IPs  8 Unique IPs  76 Unique IPs  13 Unique IPs  26 Unique IPs  0 Unique IPs
```

( SEARCH 🔍 ) FROM ( MM-DD-YYYY ) TO ( MM-DD-YYYY ) FILTER RESULTS: ( ALL CATEGORIES ⌄ ) ☑ Only Impacts Grade
Filter By Tags                                                                                    — 344
                            ↖ 342

| File Sharing Category | IP Address | Start | End | Impacts Grade | Days | Whitelisted |
|---|---|---|---|---|---|---|
| Movies ⟨ Subsidiary - Int ⟩ | 24.6.18.9 | 03-14-2016 | 03-27-2016 | ✓ | 14 | No |
| Movies ⟨ Subsidiary - Int ⟩ | 24.6.19.139 | 03-27-2016 | 03-27-2016 | ✓ | 1 | No |

FIG. 14A

| | | | | | | | |
|---|---|---|---|---|---|---|---|
| Movies [Subsidiary - Int] | 24.6.16.253 | 03-26-2016 | 03-26-2016 | ✓ | 1 | No | |
| Movies [Subsidiary - Int] | 24.6.16.253 | 03-26-2016 | 03-26-2016 | ✓ | 1 | No | |
| Movies [Subsidiary - Int] | 24.6.19.139 | 03-26-2016 | 03-26-2016 | ✓ | 1 | No | 340 |
| Movies [Subsidiary - Int] | 24.6.20.46 | 03-26-2016 | 03-26-2016 | ✓ | 1 | No | 341 |
| Movies [Subsidiary - Int] | 24.6.16.17 | 03-26-2016 | 03-26-2016 | ✓ | 1 | No | |
| Movies [Subsidiary - Int] | 24.6.16.253 | 03-25-2016 | 03-25-2016 | ✓ | 1 | No | |
| Movies [Subsidiary - Int] | 24.6.18.9 | 03-25-2016 | 03-25-2016 | ✓ | 1 | No | |
| TV [Subsidiary - Int] | 24.6.20.2 | 03-25-2016 | 03-25-2016 | ✓ | 1 | No | |
| Movies [Subsidiary - Int] | 24.6.16.252 | 03-23-2016 | 03-24-2016 | ✓ | 2 | No | |
| Movies [Subsidiary - Int] | 24.6.16.253 | 03-09-2016 | 03-24-2016 | ✓ | 16 | No | |
| Movies [Subsidiary - Int] | 24.6.16.253 | 03-22-2016 | 03-24-2016 | ✓ | 3 | No | |
| Movies [Subsidiary - Int] | 24.6.16.253 | 03-24-2016 | 03-24-2016 | ✓ | 1 | No | |
| Movies [Subsidiary - Int] | 24.6.18.33 | 03-24-2016 | 03-24-2016 | ✓ | 1 | No | |
| TV [Subsidiary - Int] | 24.6.19.139 | 03-23-2016 | 03-23-2016 | ✓ | 1 | No | |
| TV [Subsidiary - Int] | 24.6.18.179 | 03-19-2016 | 03-19-2016 | ✓ | 1 | No | |
| Games | 24.12.169.155 | 03-19-2016 | 03-19-2016 | ✓ | 1 | No | |
| Applications [Subsidiary - Int] | 24.6.16.115 | 03-19-2016 | 03-19-2016 | ✓ | 1 | No | |
| Applications [Subsidiary - Int] | 24.6.18.74 | 03-13-2016 | 03-17-2016 | ✓ | 5 | No | |

Showing 1 to 20 of 99 entries*
(filtered from 1,150 total entries)
*This is a representative sample of all 3,296 observed torrents

[FIRST] [PERVIOUS] [1] [2] [3] [4] [5] [NEXT] [LAST]

FIG. 14B

| BITSIGHT | PORTFOLIO ˅ | MY COMPANY | ALERTS | 🔍 Search Companies |

Overview | Rating Details | Events | Diligence | User Behavior | My Infrastructure | Forensics

Saperix, Inc.
⚙ Technology
🏠 Saperix.com
◉ 5,786 IP addresses
👤 615 searches

BITSIGHT SECURITY RATING 360 (COMPARE)

📄 Download this Security Ratings report (📁 ADD TO)  Folders: All Companies
(📁 VIEW SERVICE PROVIDERS)

FORENSICS  📥 Download forensics data

FILTER  Showing events 1-20 of 2996.  Order results by: (MOST RECENT ˅)

IP ADDRESS SEARCH  Expand all (e.g. 192.0.2.0  🔍)

TIME RANGE
ALL Time
Last 7 days
Last 30 days
Custom Date Range
NARROW BY RISK VECTOR
All Forensics
Events
 Botnet Infections (451)
 Spam Propagation (0)
 Malware Servers (0)
 Potentially Exploited (487)
 Unsolicited Comm. (49)
 User Behavior
 File Sharing (2,184)

File Sharing  IP Address: 24.6.128.76
  ⬅ Corporate Wifi
Source Port  8999  Date Seen: 03-05-2016
Category  Books  Location: United States
Torrent Hash  5481ceba846dd4910a528451042e81eb95efcb85
Details˅

Botnet Infections: Conficker  IP Address: 24.6.128.88
  ⬅ Corporate Wifi
Source Port  2986  Date Seen: 03-30-2015
Destination Port  80  Location: United States
C&C IP  XXX.102.150.27
Details˅

Botnet Infections: Conficker  IP Address: 24.6.128.88
  ⬅ Corporate Wifi
Source Port  2881  Date Seen: 03-30-2015
Destination Port  80  Location: United States
C&C IP  XXX.66.15.109
Details˅

FIG. 15A

| File Sharing | | IP Address: 24.6.128.76 |
|---|---|---|
| | | ◁ ☒ Corporate Wifi |
| Source Port | 8968 | Date Seen: 03-05-2016 |
| Category | Books | Location: United States |
| Torrent Hash | 5482ceba746dd4910a628441042e81eb96efcb86 | |
| Details˅ | | |
| Botnet Infections: Conficker | | IP Address: 24.6.128.88 |
| | | ◁ ☒ Corporate Wifi |
| Source Port | 2976 | Date Seen: 03-30-2015 |
| Destination Port | 80 | Location: United States |
| C&C IP | XXX.102.150.54 | |
| Details˅ | | |
| File Sharing | | IP Address: 24.6.128.76 |
| | | ◁ ☒ Corporate Wifi |
| Source Port | 8986 | Date Seen: 03-05-2016 |
| Category | Books | Location: United States |
| Torrent Hash | 5483ceba844dd4910a528471042e81eb97efcb87 | |
| Details˅ | | |
| File Sharing | | IP Address: 24.6.128.76 |
| | | ◁ ☒ Corporate Wifi |
| Source Port | 8994 | Date Seen: 03-05-2016 |
| Category | Books | Location: United States |
| Torrent Hash | 5484ceba846dd4910a528441042e81eb94efcb84 | |
| Details˅ | | |
| Botnet Infections: Conficker | | IP Address: 24.6.128.88 |
| | | ◁ ☒ Corporate Wifi |
| Source Port | 2954 | Date Seen: 03-30-2015 |
| Destination Port | 80 | Location: United States |
| C&C IP | XXX.102.150.34 | |
| Details˅ | | |

FIG. 15B

| Botenet Infections: Conficker | | | IP Address: 24.6.128.88 |
|---|---|---|---|
| | | | ☒ Corporate Wifi |
| Source Port | 2945 | | Date Seen: 03-30-2015 |
| Destination Port | 80 | | Location: United States |
| C&C IP | XXX.102.150.30 | | |
| Details⌄ | | | |

| Botenet Infections: Conficker | | | IP Address: 24.6.128.88 |
|---|---|---|---|
| | | | ☒ Corporate Wifi |
| Source Port | 2932 | | Date Seen: 03-30-2015 |
| Destination Port | 80 | | Location: United States |
| C&C IP | XXX.102.140.23 | | |
| Details⌄ | | | |

| File Sharing | | IP Address: 24.6.128.76 |
|---|---|---|
| | | ☒ Corporate Wifi |
| Source Port | 8976 | Date Seen: 03-05-2016 |
| Category | Books | Location: United States |
| Torrent Hash | 5486ceba843dd4910a5284321042e81eb95efcb82 | |
| Details⌄ | | |

| File Sharing | | IP Address: 24.6.128.76 |
|---|---|---|
| | | ☒ Corporate Wifi |
| Source Port | 8965 | Date Seen: 03-05-2016 |
| Category | Books | Location: United States |
| Torrent Hash | 5489ceba846dd4510a528471042e89eb95efcb89 | |
| Details⌄ | | |

| Botenet Infections: Conficker | | | IP Address: 24.6.128.88 |
|---|---|---|---|
| | | | ☒ Corporate Wifi |
| Source Port | 2987 | | Date Seen: 03-30-2015 |
| Destination Port | 80 | | Location: United States |
| C&C IP | XXX.102.150.34 | | |
| Details⌄ | | | |

FIG. 15C

| Botnet Infections: Conficker | | IP Address: 24.6.128.88 |
|---|---|---|
| | | ◁ Corporate Wifi |
| Source Port | 2934 | Date Seen: 03-30-2015 |
| Destination Port | 80 | Location: United States |
| C&C IP | XXX.102.130.28 | |
| Details⌄ | | |

| Botnet Infections: Conficker | | IP Address: 24.6.128.88 |
|---|---|---|
| | | ◁ Corporate Wifi |
| Source Port | 2965 | Date Seen: 03-30-2015 |
| Destination Port | 80 | Location: United States |
| C&C IP | XXX.102.140.39 | |
| Details⌄ | | |

| Botnet Infections: Conficker | | IP Address: 24.6.128.88 |
|---|---|---|
| | | ◁ Corporate Wifi |
| Source Port | 2932 | Date Seen: 03-30-2015 |
| Destination Port | 80 | Location: United States |
| C&C IP | XXX.102.150.20 | |
| Details⌄ | | |

| File Sharing | | IP Address: 24.6.128.76 |
|---|---|---|
| | | ◁ Corporate Wifi |
| Source Port | 8965 | Date Seen: 03-05-2016 |
| Category | Books | Location: United States |
| Torrent Hash | 5489ceba846dd49546 | |
| Details⌄ | | |

| File Sharing | | IP Address: 24.6.128.76 |
|---|---|---|
| | | ◁ Corporate Wifi |
| Source Port | 8987 | Date Seen: 03-05-2016 |
| Category | Books | Location: United States |
| Torrent Hash | 5484ceba846dc49123 | |
| Details⌄ | | |

FIG. 15D

| BITSIGHT | PORTFOLIO ⌄ | MY COMPANY | ALERTS | 🔍 Search Companies | ⚑ ⓘ ⚙⌄ |

| Overview | Rating Details | Events | Diligence | User Behavior | My Infrastructure | Forensics |

Saperix, Inc.
⚙ Technology
🏠 Saperix.com
⊚ 5,786 IP addresses
👥 615 searches

BITSIGHT SECURITY RATING
360 (COMPARE)

📄 Download this Security Ratings report (ADD TO)    Folders: All Companies
(VIEW SERVICE PROVIDERS)

FORENSICS                                                                    📥 Download forensics data FILTER    Showing events 1-3 of 3.                    Order results by: (Most Recent ⌄)

IP ADDRESS SEARCH        326 ⌐                                                  Expand all
(e.g. 192.0.2.0  🔍)     File Sharing                    330 ⌐ IP Address: 24.6.128.76
                                                                ☑ Corporate Wifi TIME RANGE
320 — ALL Time           Source Port    8999         332 ⌐  Date Seen: 03-05-2016
     Last 7 days         Category       Books               Location: United States
     Last 30 days        Torrent Hash   5481ceba846dd4910a528451042e81eb95efcb85
     Custom Date Range   Details ⌄                                           326

NARROW BY RISK VECTOR    Botenet Infections: Conficker       IP Address: 24.6.128.88
322 — All Forensics                                                  ☑ Corporate Wifi
324 — Events
     Botnet Infections (451)    Source Port       2986    Date Seen: 03-30-2015
     Spam Propagation (0)       Destination Port  80      Location: United States
     Malware Servers (0)        C&C IP            XXX.102.150.27
     Potentially Exploited (487) Details ⌄
     Unsolicited Comm. (49)     Botnet Infections: Conficker      IP Address: 24.6.128.88
     User Behavior                                                   ☑ Corporate Wifi
     File Sharing (2,184)
                               Source Port       2881    Date Seen: 03-30-2015
                               Destination Port  80      Location: United States
                               C&C IP            XXX166.15.109
                               Details ⌄

FIG. 16A

ANNOTATION PLATFORM FOR A SECURITY RISK SYSTEM

This application is a continuation-in-part and claims priority under 35 U.S.C. §120 to U.S. patent application Ser. No. 14/021,585, filed Sep. 9, 2013, the entire content of which is incorporated here by reference.

This application is related to U.S. patent application Ser. No. 13/240,572, filed Sep. 22, 2011 and Ser. No. 15/044,952, filed Feb. 16, 2016, all of which are incorporated here by reference in their entirety.

BACKGROUND

This description relates to an annotation platform for a security risk system.

Security risks posed by entities in connection with their technology assets, for example, can be analyzed by first accumulating information about the assets, such as from online sources, and then processing and storing the information centrally. The stored information can be analyzed to determine security risks, among other things. In some cases, the results are in the form of ratings of the security risks posed by the entities and events and diligence records related to the entities.

SUMMARY

In general, in an aspect, information is acquired and stored by computer that is indicative of security risks associated with security subjects and with entities to which the security subjects belong. The stored information is analyzed by computer to derive security indicators for the entities. With respect to entities selected by the users, security information is presented by computer to users. The security information includes security indicators for the entities and security information for security subjects. The security information for security subjects includes annotations provided by users. The annotations are managed by computer based on communications from the users.

Implementations may include one or combinations of two or more of the following features. The security subjects comprise IP addresses. The IP addresses include blocks of IP addresses. The blocks of IP addresses conform to Classless Inter-Domain Routing. The entities own, control, or manage the IP addresses that belong to them. The security subjects comprise domains. The entities own, control, or manage the domains that belong to them. The annotations include tags specified by the users. The annotations are specified by selection from an existing set of available tags. The analyzing of the stored information includes updating a stored entity map between entities and security subjects. The security indicators include security ratings for corresponding entities. Permissions of users are managed based on relationships of users to entities to which the annotations relate. The managing of the annotations includes associating the annotations with corresponding entities.

The annotations describe characteristics of the security subjects. The characteristics include at least one of a type, a location, a time period, a relationship with other security subjects, a relationship with an entity, or a combination of any two or more of them. The annotations include groupings of security subjects. The groupings include subnets. The managing the annotations includes storing the annotations in a database in association with the security subjects or the entities or both.

The presenting to the users of the security information includes causing web sites or mobile apps to expose user interfaces to the users. The presenting to the users of the security information includes managing the presenting based on the user's relationship with one or more of the entities. At least some of the users are affiliated with corresponding entities and can add, alter, or remove annotations for the corresponding entities, can view public information for other entities, but cannot add, alter, or remove annotations for any other entities.

The information presented to the users includes information about events indicative of the security risks. The information presented to the users includes information about diligence. The information presented to the users comprises information about behavior of users of the security subjects. The information presented to the users comprises information about forensics.

In general, in an aspect, an annotation facility operated by computer enables users to add, alter, or remove annotations indicative of security risks associated with respective security subjects or entities to which the security subjects belong. Information is presented by computer and through a communications network that is about security risks associated with security subjects and with entities to which the security subjects belong. The information about the security risks includes the annotations. The presenting of the information to the users includes at least one of visually associating the annotations with the respective security subjects or entities, allowing the users to filter information that is being presented based on the annotations, and allowing authorized users to add, alter, or remove annotations in the annotation facility.

Implementations may include one or combinations of two or more of the following features. The security subjects include IP addresses. The IP addresses include blocks of IP addresses. The blocks of IP addresses conform to Classless Inter-Domain Routing. The entities own, control, or manage the IP addresses that belong to them. The security subjects comprise domains. The entities own, control, or manage the domains that belong to them.

The annotations include tags specified by the users by selecting from sets of available tags. The annotations describe characteristics of the security subjects. The characteristics include at least one of a type, a location, a time period, a relationship with other security subjects, a relationship with an entity, or a combination of any two or more of them. The annotations include groupings of IP addresses. The groupings include subnets.

The operating of an annotation facility includes storing the annotations in a database in association with the respective security subjects or the entities or both. The presenting to the users of the security information includes causing web sites or mobile apps to expose user interfaces to the users. The presenting to the users of the information about security risks includes managing the presenting based on the user's relationship with one or more of the entities. At least some of the users are affiliated with corresponding entities and can add, alter, or remove annotations for the corresponding entities, can view public information for other entities, and cannot add, alter, or remove annotations for any other entities.

These and other aspects, features, implementations, and advantages, and combinations of them can be expressed as methods, apparatus, systems, components, program products, databases, business methods, steps and means for performing functions, and in other ways.

These and other aspects, features, implementations, and advantages, and combinations of them will become apparent from the following description and from the claims.

DESCRIPTION

FIGS. 4 through 16A-16B are screen shots of a user interface.

Figure 1:
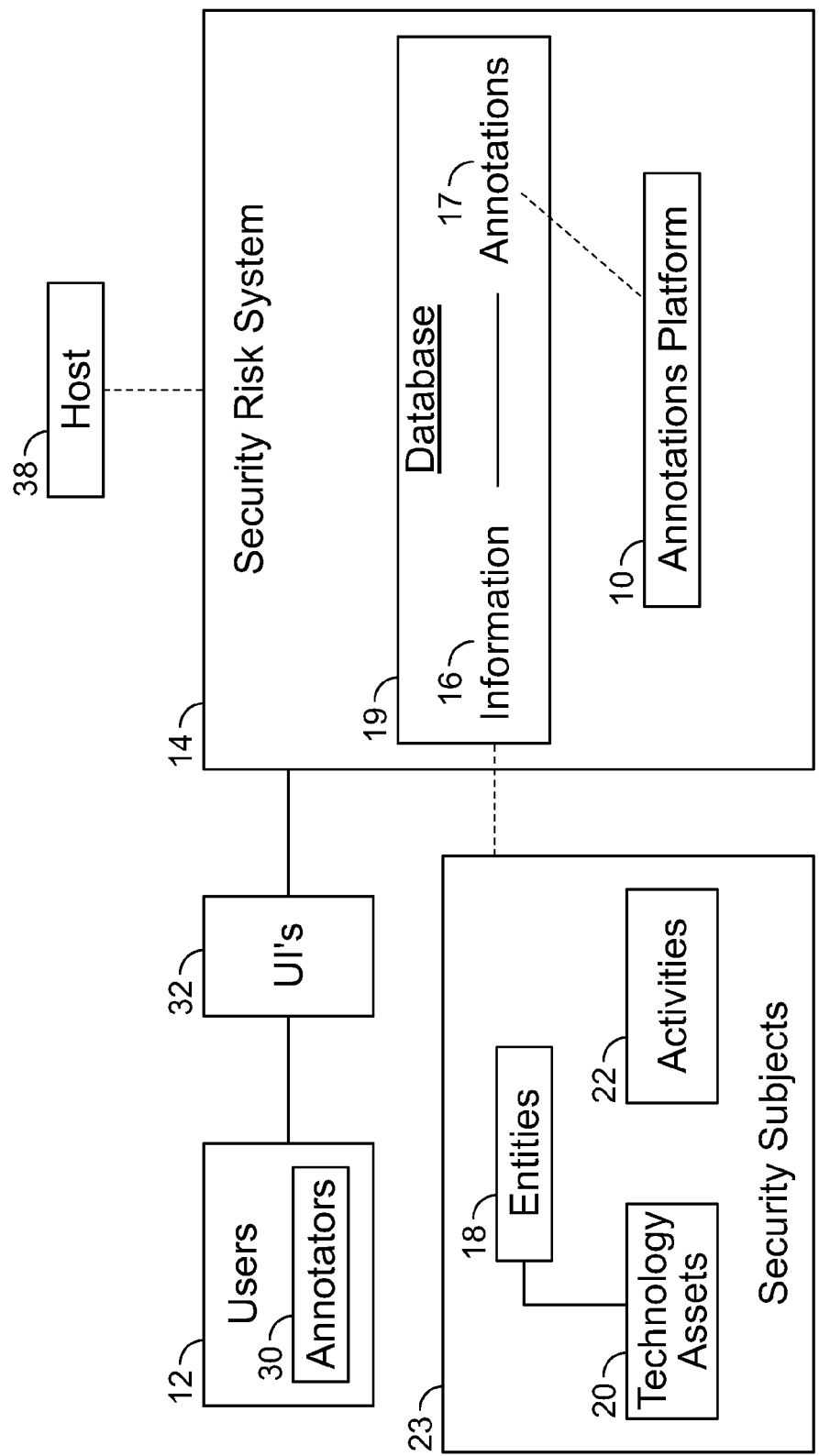
FIGS. 1 through 3 are block diagrams.

As shown in FIG. 1, we describe systems and techniques (which we together sometimes refer to as an "annotations platform" 10, which we sometimes also refer to as an annotations facility) that enable users 12 of a centrally hosted security risk analysis and rating system 14 (which we sometimes call the "security risk system"; for example the systems operated by BitSight Technologies) to provide annotations 17 with respect to information 16 stored in a database 19. The information in the database relates to entities 18, their technology assets 20 (such as IP addresses and domains), and activities 22 related to the entities and the assets (we sometimes refer to the entities, the assets, and the activities together more generally as "security subjects" 23). Among other things, the annotations platform enables a user to specify annotations in the form of groupings of security subjects, such as by specifying IP addresses as belonging to subnets. The annotations platform 10 can be part of the security risk system or can be operated separately.

The annotations 17 and the annotation platform provide a medium by which a user can record notes or apply tags or in other ways record comments or interpretations about the security subjects that may be useful both to the user and to other users. The annotations can be especially useful in capturing information that may help other users to understand the nature or seriousness of (and to respond to and act on) security risks related to the security subjects.

We use the term "security subjects" broadly to include, for example, any device, feature, asset, facility, equipment, or operation that can be associated with a security risk such as a risk to an entity or to its technology assets or to parties interested in doing business with an entity or interacting with its technology assets.

We use the term "annotation" broadly to include, for example, any characterization, tag, label, identifier, organizational principle, opinion, view, note, or any other piece of information or commentary that pertains to (and that a user can attach to) to a security subject or to a related group of security subjects. An annotation can be stored by or in a security risk system or an annotation platform. Typically the security subject or subjects to which an annotation relates will be identified or specified.

We use the term "annotate" broadly to include, for example, writing, selecting, or in any other way expressing an annotation and also identifying the one or more security subjects to which it relates.

We use the term "events" broadly to include, for example, any indication of an occurrence of a security related happening. Among other things, this can include a detection of malicious activity on a network, a failed authentication process, or an attempt to perform an action without sufficient authorization.

We use the term "diligence records" broadly to include, for example, any report, notation, or explanation of an activity undertaken to determine or correct an issue related to a security subject. As one example, a diligence record might be entered by a user as the following text. "I found the computer—it belonged to James Doe, and he has now turned on the anti-virus program. 1 st/April/2016".

In typical implementations, the users who create, update, organize, remove, or otherwise deal with annotations (we will sometimes refer to them as "annotators" 30 and to such activities as "annotating") are users who have knowledge (in some cases, special knowledge) about the security subjects. The users' knowledge may be based on their relationships with one or more of the security subjects, for example, if a user is an employee of an entity, or otherwise has knowledge of security subjects associated with it.

In some cases, the knowledge of the annotators involves information that is not typically available by using a computer to automatically sense activities occurring on the Internet or from published non-electronic sources. For example, the annotator may know the physical locations of a set of technology assets (e.g., servers) within a company, or may be aware of the purposes to which certain technology assets are devoted by a company.

The annotations may describe or identify a variety of characteristics of the target security subjects (we use the word "target" to refer to sometimes to a security subject to which an annotation pertains). The characteristics can be quantitative or qualitative. For example, the characteristics could identify or describe types, ages, sizes, locations, classes, capabilities, or purposes, among others, of one or more of the security subjects.

The character and style of the annotations can vary. For example, annotations can be rigorous, specific, accurate, disciplined, and complete, or they can be informal, vague, incomplete, impressionistic, or at least partly inaccurate, or they can have a mix of such qualities. The annotations platform can provide automated or human (or both) curation, screening, editing, and monitoring features to improve the quality, completeness, and utility of proposed annotations or actual annotations, and to filter out junk. Functions can be provided to assure that the annotations are "attested" or "tested" or have other similar credibility features.

Among other features and facilities, the annotations platform can enable users (including users other than the ones who were the sources of the annotations) to view the annotations. We sometimes refer to such users as "observers." Observers can be but need not be annotators, and a given user can at times be an annotator and at times be an observer.

Annotators and observers can sometimes be active in roles that relate to their positions relative to corresponding entities. For example, an employee of a company may be annotating and observing in an authorized capacity on behalf of the company. We sometimes refer to such users as "agents." Examples of agents are IT managers and security managers.

The annotation system can expose its features and facilities through one or more user interfaces 32 that are presented on devices through web browsers or mobile apps, for example. Different user interfaces can be provided for users who have different roles, such as observers, annotators, agents, and others. In some cases, the same user interface can serve annotators and observers, including agents.

As mentioned earlier, the annotation system may (but is not required to be) part of or related to a security risk system 14. We use the term "security risk system" broadly to include, for example, any system that accumulates, analyses, or reports data, information, conclusions, ratings, measurements, categorizations, results, or other information associated with security risks (such as cybersecurity risks) of security subjects. In some cases, the security risk system need not provide ratings, but may manage and distribute any kind of information about the security subjects.

The annotations platform can be hosted (e.g., centrally) by the same host 38 as the party that is hosting the security risk system, or in some cases by a different host.

In some implementations, the annotations platform can have features or functions of or be understood to behave as a kind of social networking platform either in its own right or as applied to or working with the security risk system. By enabling users, for example, who may be in different locations and who may be affiliated with different security subjects, to annotate (we sometimes say "to post annotations to") and to view annotations, the users and groups of them are able to develop a common, informal, easy-to-understand view and knowledge about security subjects that are of interest to them. The annotations need not be formal, structured, or approved, but can comprise any kind of content that is useful to be posted or to be viewed about the security subjects.

The annotations platform enables users to engage in conversations about security assets through the medium of the annotations ("posts"). The effect of the social networking aspects of the annotations platform can include a wider understanding of the risks associated with security subjects, the changing nature of those risks, and better practices for dealing with the risks both by the security subjects (e.g., entities) that are the subjects of the posts and by others.

The annotations platform enables entities whose security subjects are being analyzed and rated by the security risk system and entities who do business or are considering their business relationships with such entities, to annotate and observe annotations associated with the entities. These actions can be performed at the same time and through the same interface that is used to annotate and observe other information presented by a security risk system, including ratings, entity maps, and a wide variety of other kinds of information.

In some cases, the annotations contain detailed accurate pieces of evidence that tend to establish an existence, status, condition, occurrence, or event related to one or more security subjects. Therefore the annotations platform is an effective supplement and complement to the activities, features, and functions of a security risk system.

The user interfaces of the platform provide facilities for parties to post the annotations and associate them with the security subjects so that they can be easily searched for, filtered, and viewed by users who are viewing other information about those security subjects. For example, a user who is viewing a list of IP addresses that "belong" to a particular entity can also be directly presented with and view annotations for those IP addresses.

In some implementations, annotations may apply to or take the form of grouping, that is, of identifying or specifying a group, or set, or class of related security subjects (such as a subnet of IP addresses within a CIDR block). The user interface enables the user to identify such a group, set, or class, and in that sense to apply an annotation to all of the members of such a group, set, or class at one time. In some cases the members of such a group, set, or class have what we refer to as a logical relationship to one another. For example, a set of technology assets of an entity may be logically related portions of a network operated by the entity.

In some implementations, annotations can be treated as private within a controlled group or public and therefore available to any user. In some implementations of the annotations platform, the right of the user to annotate or to view annotations or to perform other functions provided by the platform are controlled by permissions. Typically, an agent or other user who is affiliated with a particular entity can be authorized to annotate information that is stored in, analyzed by, or presented through a security risk system.

A very broad range of implementations of the annotations platform are possible to serve a variety of classes of uses, purposes, and applications.

Below, we describe, as examples, implementations that involve annotations of CIDRs (classless inter-domain routings) of networks of entities, as an example. In some of the discussion we generalize the features beyond the CIDR example.

CIDR Annotations

Figure 2:
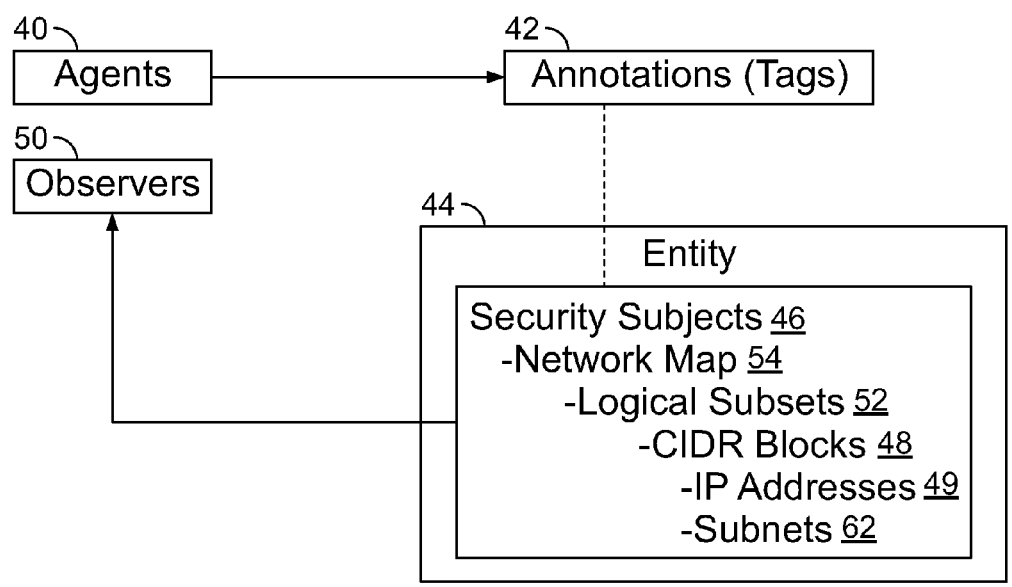

As shown in FIG. 2, among other features, the annotations platform allows agents 40 (and other users) to create, view, manage annotations 42 (and other information) about their own company's (e.g., entity's) 44 network infrastructure 46 (or other technology assets or security subjects) such as a set of CIDR blocks 48. The annotations platform also provides a way for observers 50 (e.g., observers who are agents) to view logical subsets 52 of a network map 54 of their company by filtering on one or many specific tags. The platform allows users to assign tags like "Guest WiFi", "Corporate Network", or other appropriate annotations to specific IP addresses and CIDRs within their company's network map.

The tags can refer to a wide variety of characteristics of security subjects, such as location, type, age, size, management, interrelationships, use, or any combination of two or more of them, and others. We use the phrase "network map" to refer broadly, for example, to any identification of a set of assets associated with an entity. Network maps can includes a list of IP addresses, domain names, telephone numbers, and the like. Network maps can reflect relationships of entities with other entities (e.g., parent-child) such that all the assets in the child's network map are also considered to be part of the parent's network map.

As mentioned earlier, users can use annotations to conceptually split existing CIDRs 48 into smaller subnets 62 to allow for more specific, fine-tuned, and useful annotations. One large CIDR, for example, can be broken into a subnet tagged as "Guest WiFi", a subnet tagged as "Corporate WiFi", and another tagged as "Corporate Network". Note that the act of breaking a CIDR into a subnet can itself be considered an annotation, in addition to the assigning of a tag to a given subnet.

The annotations (e.g., in the form of the tags) 42 can be stored in a database (such as database 19 in FIG. 1) maintained by the host of the security risk system. In the database, each annotation is associated with the security subjects 44 to which they apply as specified by the security risk system or an annotator or both. When a CIDR has been split into one or more subnets, information about that split can be stored in the database as a form of annotation. Additional information, such as the identity of the annotator or annotators who generated, updated, or maintained the annotation, the date of the latest change, changes to the text or content of the annotation, and the view and edit permissions for the annotation will also be stored here. The two simplest permissions might be "visible/editable to own entity only", and "editable by own entity's users and visible to all".

The annotations stored in the database can be used in connection with a wide variety of displayed user interface pages that are presented by the security risk system to users (including annotators, observers, and agents) through web browsers or mobile apps running on computers or mobile devices. For example, annotations that apply to a particular IP address could be displayed alongside security-related events and diligence records that are presented for an IP address contained in an entity's network map. Additional information about the user interface features is discussed later.

CIDR annotations give users the capability to quickly identify which parts of their infrastructure (e.g., the security subjects) (or the infrastructure of another entity, if the user has permission to view it) are affected by activities or risks to their security subjects.

CIDR Tags

As noted above, CIDR tags can be used to identify logical sections of an entity's network map. Tags may denote a variety of characteristics about a subnet, for example, how a particular subnet is used (e.g., "Guest WiFi", "Corporate", or "Stores"), its geography (e.g. "East Coast", "US" or "Europe"), the department that uses it (e.g. "Finance", "HR", or "IT"), or any other appropriate or useful characteristic. The annotation platform provides the user with pre-defined tags, like "Guest WiFi", "Corporate WiFi", and "Corporate Network", for common network designations. An annotator can easily select from among the predefined tags when annotating a security subject. Users can use the pre-defined tags or can create new tags having custom names, text, or other content. Virtually any kind or quantity of content can be included in a tag and tags can provide a kind of social network medium for discussion among users who provide annotations and respond to the annotations of other users, sometimes in a thread.

As noted above, tags (or other annotations) can be either private or public with respect to a given user. Users can be divided for that purpose into various categories. In some implementations, by default, tags are private and visible only to agents or other authorized users who are affiliated with the target security subjects. Public tags are visible to all observers and annotators (for viewing but not to alter them), including users affiliated with security subjects of other entities. An agent or other authorized user can be given a permission to change a private or public status of a tag.

The annotation platform allows multiple tags to be attached to a security subject such as a CIDR to provide more comprehensive and granular information about the target security subject. A given tag can be applied to multiple security subjects, such as CIDRs, for similar reasons. In other words, annotations and security subjects (e.g., CIDRs and tags) can have a many-to-many relationship.

In some cases, tags or other annotations are said to "belong" to an entity based on the security subjects that are the targets of the tags. For example, the annotations platform can be arranged so that a tag belongs to the entity that is the subject of the tag or to the entity to which the security subject (such as a CIDR) belongs. Permissions to annotate security subjects can be limited to agents or other authorized people who are affiliated with the entity. As an example, only users who belong to a given company may have permission to manage CIDRs and tags for that company.

We broadly say that a security subject (e.g., an IP address or CIDR block) "belongs" to an entity if the entity, for example, owns the security subject, controls, manages, operates, supervises, or is otherwise in charge of it.

Splitting CIDRs

As mentioned earlier, the annotations platform allows agents to split CIDRs already in their entity's network map into smaller subnets. Splitting CIDRs into smaller, more-specific subnets is useful because it provides a way for users to annotate the network infrastructure more specifically, clearly, and finely. For example, a /24 CIDR can be split into multiple logical sections (e.g., blocks or subnets) like a /28 block tagged with "Cloud Computing" and a /30 block tagged as "Corporate Network". CIDRs can be identified in notation that conforms to IPv4 or IPv6.

Observing Annotations

As mentioned earlier, the annotations platform provides user interfaces through browsers or mobile apps that enable users to view annotations together with their related security subjects at one time and on the same displayed screen.

Agents, for example, can view both private tags for entities with which they are affiliated and public tags of security subjects of other entities, in each case alongside the display of information for the related security subjects. As noted earlier, the annotations platform restricts users who are not affiliated with a given entity to see only public tags with respect to the security subjects that belong to that entity.

The user interface provides features to enable the users to navigate and simplify their views of the security subjects and related annotations. For example, users can reduce the number and complexity of events and other security subjects presented to them by using a combination of tags to filter only relevant information for analysis. For example, a user can select to view only the security events and diligence records that occur on "Guest WiFi" tagged CIDRs. The platform also allows users to generate PDF, CSV, and other reports using the annotated data.

Architecture

Figure 3:
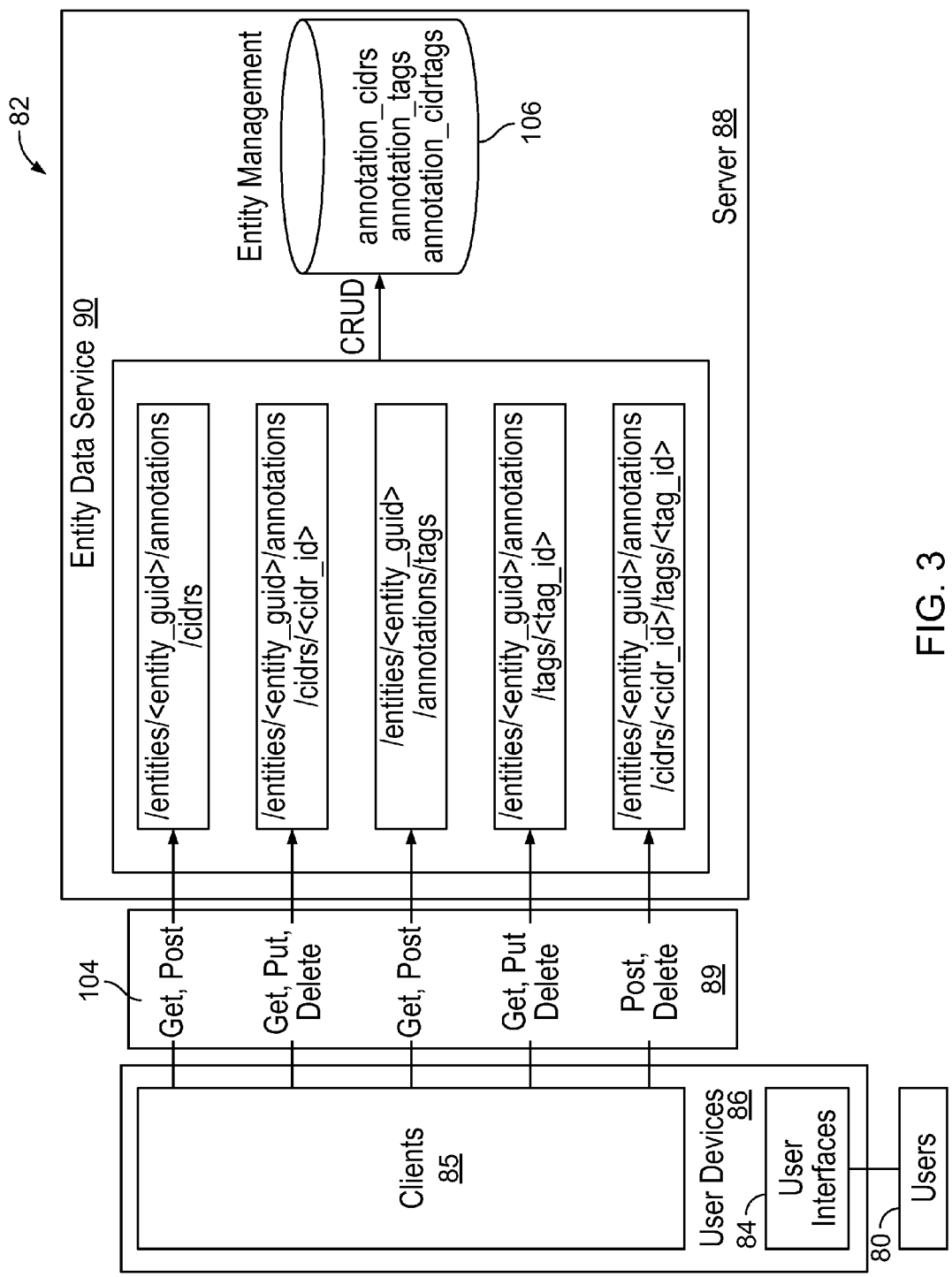

As shown in FIG. 3, users 80 can interact with the annotation platform 82 through user interfaces 84 of a web browser, mobile app, or other frontend client 85 running on any of a wide variety of user devices 86. The frontend clients are served by one or more central servers 88 maintained, for example, by the host of the security risk system. Communication between the clients 85 and the servers 88 occur through any available communication medium 89, such as the Internet.

Frontend clients communicate with services 90 exposed by the server to create, review, update, and delete CIDR tags and user-defined CIDRs according to actions of the users.

As shown in FIG. 3, the entity data services of the security risk system or annotation platform or both can expose a set of RESTful APIs that clients can use to access annotation (CIDR and tag) resources. Data can be transmitted in JSON format. Clients 85 communicate with the entity data services 90 using requests 104 GET, POST, PUT, and DELETE. The entity data services use CRUD services to communicate with the entity management database 106 which stores the CIDRs, the TAGS and the CIDRTAGS.

The tables below list the REST resources identified in FIG. 3 that are made available to the clients of the annotations platform.

CIDRs

URL: v1/entities/<entity_guid>/annotations/cidrs

| HTTP Method | Description | Data and Parameters | HTTP Response Code |
|---|---|---|---|
| GET | Gets all user-defined CIDRs for an entity. | visibility (private, public, default = all) | 200 OK |

-continued

| HTTP Method | Description | Data and Parameters | HTTP Response Code |
|---|---|---|---|
| POST | Creates new CIDR. | CIDR (IPv4 or IPv6 notation) | 201 Created, 400 Bad Request |

URL: v1/entities/<entity_guid>/annotations/cidrs/<cidr_id>

| HTTP Method | Description | Data and Parameters | HTTP Response Code |
|---|---|---|---|
| GET | Gets CIDR by ID. |  | 200 OK, 404 Not Found |
| PUT | Updates CIDR. | cidr (IPv4 or IPv6 notation) | 200 OK, 400 Bad Request, 404 Not Found |
| DELETE | Deletes CIDR. |  | 204 No Content, 404 Not Found |

Tags

URL: v1/entities/<entity_guid>/annotations/tags

| HTTP Method | Description | Data and Parameters | HTTP Response Code |
|---|---|---|---|
| GET | Gets all tags for an entity. | visibility (private, public, default = all) | 200 OK |
| POST | Creates new tag. | name, public (default = false) | 201 Created, 400 Bad Request |

URL: v1/entities/<entity_guid>/annotations/tags/<tag_id>

| HTTP Method | Description | Data and Parameters | HTTP Response Code |
|---|---|---|---|
| GET | Gets tag by ID. |  | 200 OK, 404 Not Found |
| PUT | Updates tag. | name, public (default = false) | 200 OK, 400 Bad Request, 404 Not Found |
| DELETE | Deletes tag. |  | 204 No Content, 404 Not Found |

CIDR Tags

URL: v1/entities/<entity_guid>/annotations/cidrs/<cidr_id>/tags/tag_id>

| HTTP Method | Description | Data and Parameters | HTTP Response Code |
|---|---|---|---|
| POST | Add tag to CIDR. |  | 201 Created, 400 Bad Request, 404 Not Found |
| DELETE | Remove tag from CIDR. |  | 200 OK, 400 Bad Request, 404 Not Found |

Examples of REST data formats are shown below:

```
{
  "id":1,
  "cidr":"192.0.0.0/24",
  "tags":[
    {
      "id":1,
      "name":"name1",
      "public":false
    }
  ]
}
```

Tag

```
{
  "id":1,
  "entity": 106681,
  "name":"name1",
  "public":false
}
```

User Interfaces

FIG. 4 through 15A-15E illustrate features of examples of user interfaces for an annotations system, in this instance focused on CIDRs, the process of breaking them into subnets, and the process of adding, viewing, and managing tags.

Figure 4:
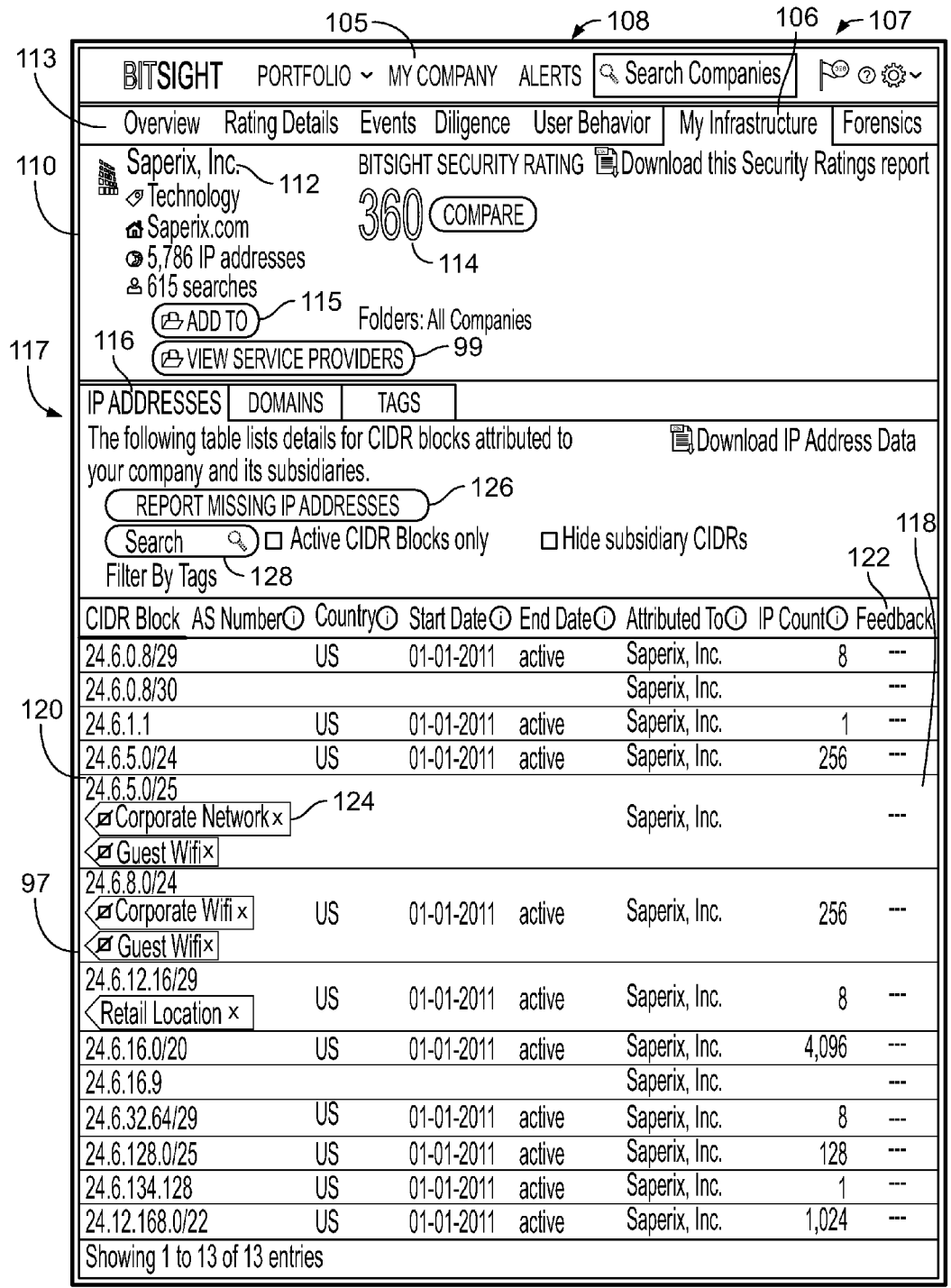

FIG. 4 shows a web page 107 of a security risk system. At the top of the page is a navigation bar 108 that allows a user (e.g., an agent of an entity) to view selectively a portfolio of entities associated with the entity with which the user is affiliated, information about that entity, or alerts that are of interest to such a user. The page shown in FIG. 4 is the page for the entity with which the user is affiliated, which is reached by clicking on the "My company" tab 105.

The available information on this "My company" page can be navigated by invoking the tabs 113 labeled "Overview", "Rating Details" (which provides information about the security rating 114 that has been applied to the company), "Events" (which provides information about events associated with the company, Diligence (which provides information about the level of care taken when configuring the network assets of an entity), "User Behavior" (which reports on behaviors of users of the CDIR blocks and IP addresses of the company), "My Infrastructure" (which displays information about CIDR blocks, IP addresses, domains, user-annotated tags and other security subjects associated with the company) and "Forensics" (which provides which provides a more detailed view of the data shown in the other views and presents the evidence that supports the conclusions in the other views.).

In the top panel 110 of web page 107, an identified company 112 is described in terms of its business area, domain, number of IP addresses, number of searches, and a security rating 114. An "Add To" button 115 enables a user to associate the entity with a logical folder of related entities, a "View Service Providers" button 99 enables the user to view similar information about entities that provide services to the company. The tabs 113 and the overview information about the company that appear in the top panel remain visible in many of the web pages to which the user can navigate. Specific information about the company is generally shown in the area 97 below the top panel often in the form of a table and related information.

The particular page shown in FIG. 4 is presented in response to the user clicking the "My infrastructure" tab 106. The specific information about the infrastructure can then be navigated using another set of tabs 117.

The lower portion 97 of page 107 displays a selected set of information related to security subjects of the company that is being references in the upper panel. The information displayed in the lower panel is determined by the selection of one of the tabs, such as the IP addresses tab 116 (which is active in the figure), a domains tab, and a tags tab.

The resulting display includes a table 118 of rows 120 each of which identifies a CIDR block or an individual IP address, its AS (autonomous system) number, the country in which it is registered, the start date of its registration, the end date, the entity it has been attributed, an IP count (e.g., the number of IP addresses in the CIDR block) and a column 122 for feedback that shows an ellipses in each line.

Also shown on the table in conjunction with the other information are tags 124. Each of the tags appears within a colored box and includes text and icons. Four different tags are shown on the figure: Corporate Network, Guest WiFi, Corporate WiFi, and Retail Location. The first three are shown with an icon at the left end of the text indicating that the tag is visible only to agents of the entity that is associated with the CIDR block or IP address being tagged The fourth one is shown in a different color (with typeface bolded) indicating that it is publicly visible (that is, is visible to other users in addition to the agent using this page). Each of the tags is shown below the IP address or CIDR block to which it applies. Each of the tags can be removed from the table by clicking on the x next to its name.

Above the table is a button 126 that can be invoked to report missing IP addresses which enables the agent of the entity to provide information about IP addresses of the entity that are missing from the table. A search box 128 enables the user to search for CIDR blocks or IP addresses and to have the search apply only to active CIDR blocks and to hide subsidiary CIDRs if she wishes.

Figure 5:
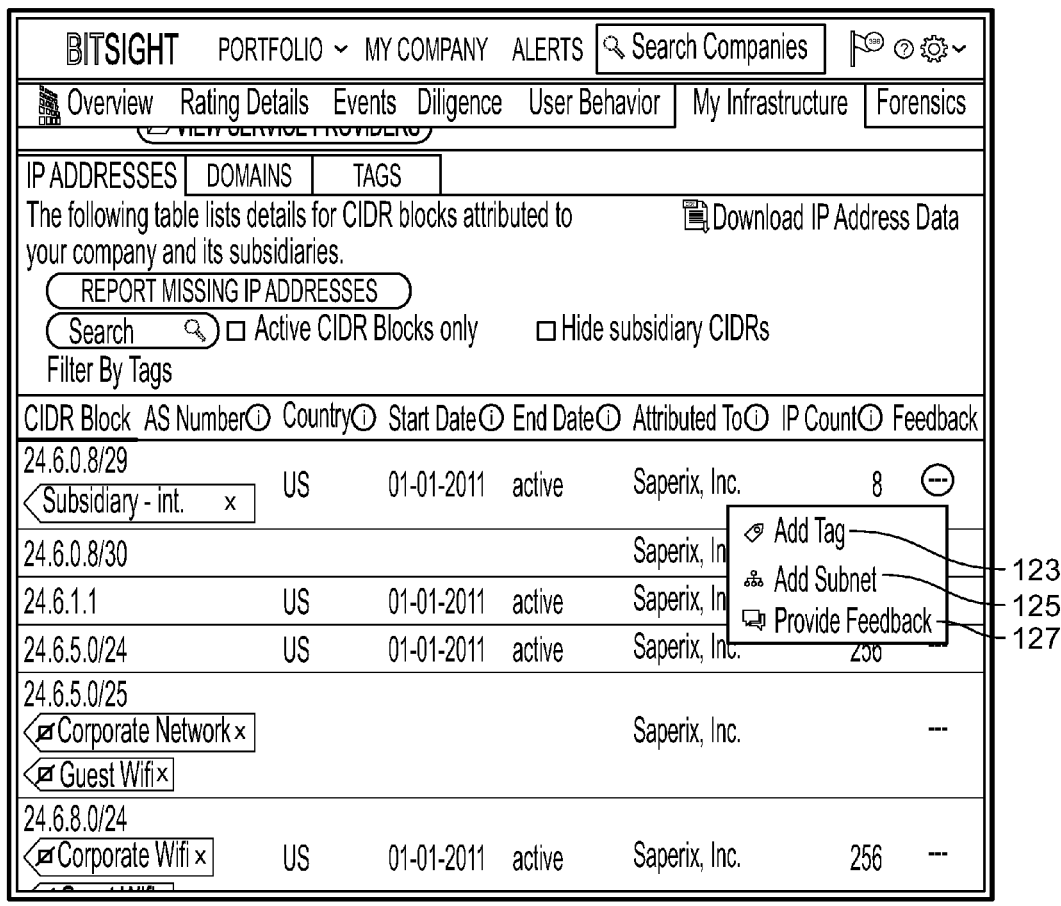

When and ellipsis 122 is invoked for a given row in the table, the dialog box shown in FIG. 5 appears enabling the user to perform various actions with respect to the tags. The choices are to "Add a Tag" 123, "Add a Subnet" 125, or "Provide Feedback" 127.

Figure 6:
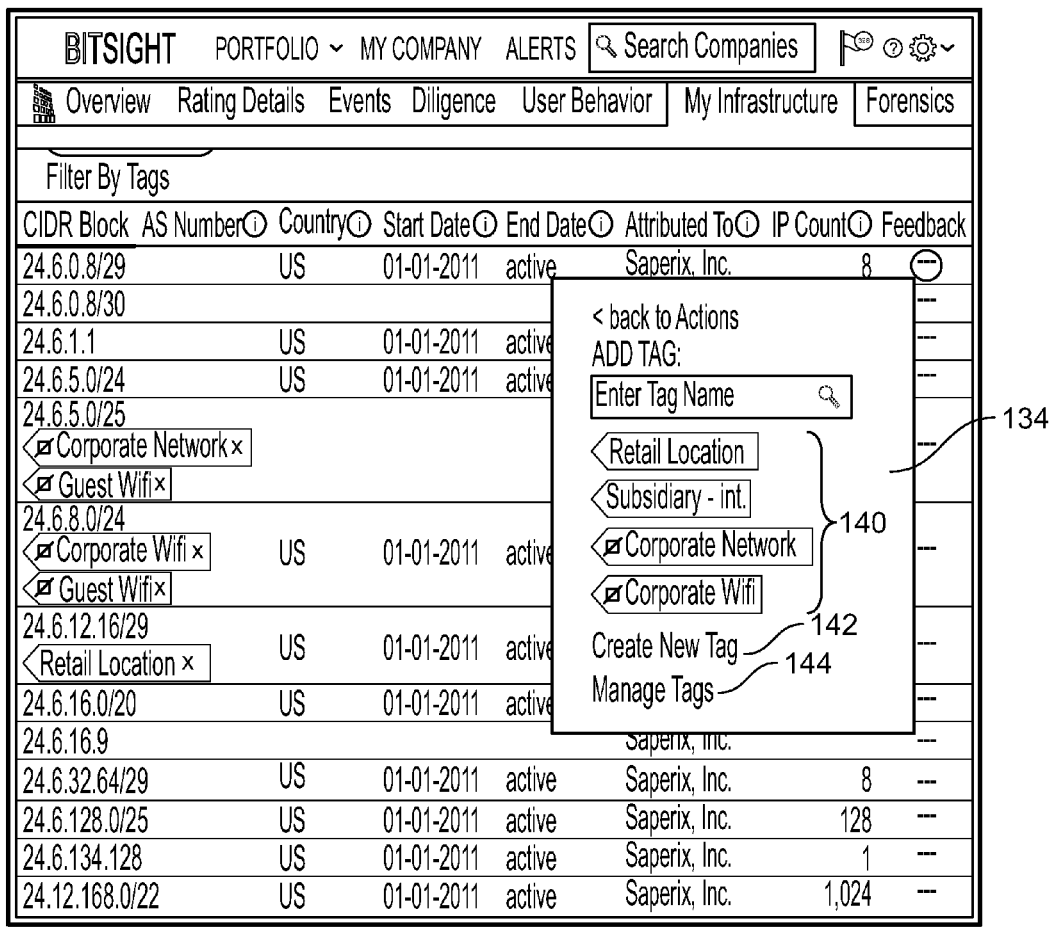

When the "Add a Tag" link is invoked, the dialog box 134 in FIG. 6 is presented. In that box, the user can add an existing tag to the CIDR block or IP address for that row by entering the name of the tag in the box. A list 140 of at least some of the available tags is provided below the text entry box and the user can click one or more of those to have it added to that row of the table. A "Create New Tag" link 142 and a "Manage Tags" link 144 can be invoked if the user wants to perform either of those actions.

Figure 7:
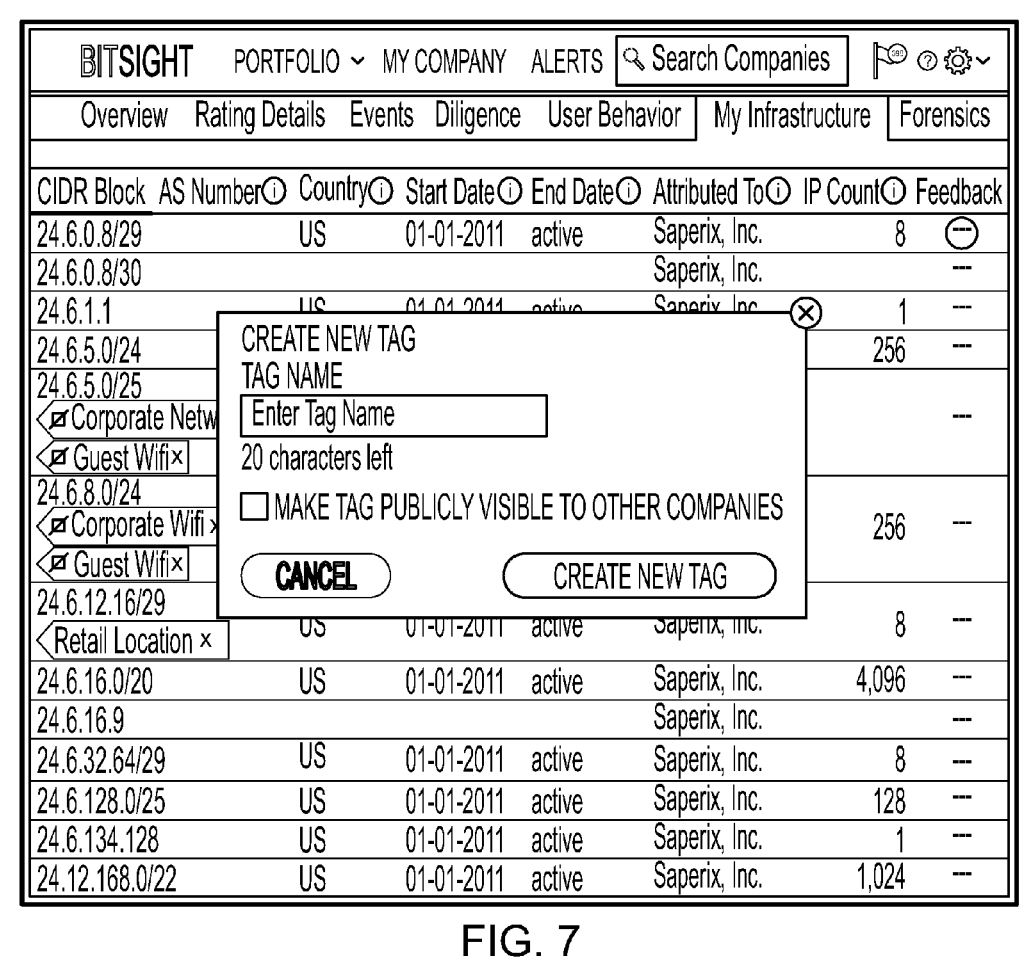

When the "Create New Tag" link 142 is invoked, the dialog box shown in FIG. 7 is displayed. The user can enter a new tag name in the text box, indicate whether the tag should be publicly visible to users affiliated with other entities, and then cancel the transaction or create the new tag.

Figure 8:
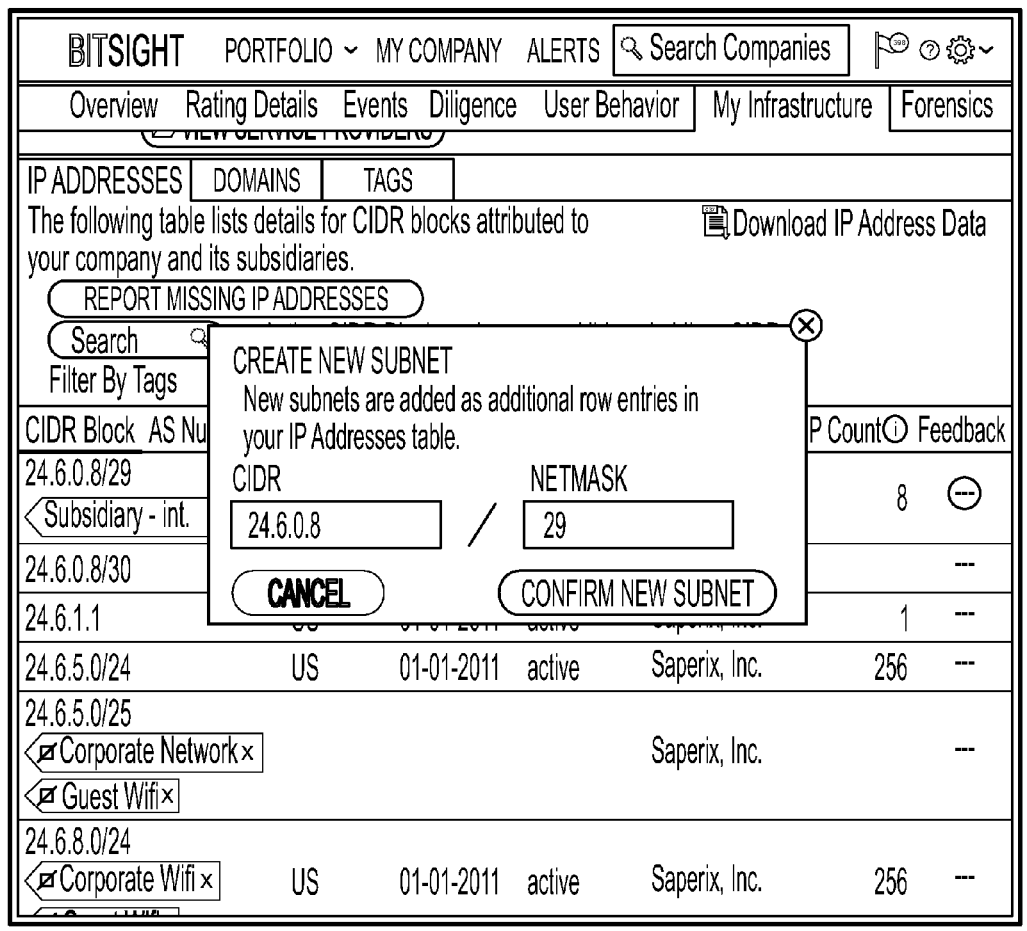

When the "Create New Subnet" link in FIG. 5 is invoked, the dialog box shown is FIG. 8 is presented. The user can enter the CIDR block number and the netmask and then either cancel the transaction or confirm the new subnet which is then added as a new row in the table. An error message is displayed if the user attempts to enter an invalid CIDR.

As shown in FIG. 9, the "Filter By Tags" link of FIG. 4 (or other figures) enables a user to filter what is displayed in a table based on selected filters. Tag links 231 are displayed to the right of the "Filter By Tags" link to indicate the tags that are active in the filtering represented by the displayed rows of the table. In addition, when the "Filter By Tags" link is invoked, a dialog box 233 is presented to enable the user to specify tags for filtering. The user can enter a name 267 of a tag to serve as the basis for filtering, and the user can select one or more of tags in the list 269 as filtering criteria.

Figure 10:
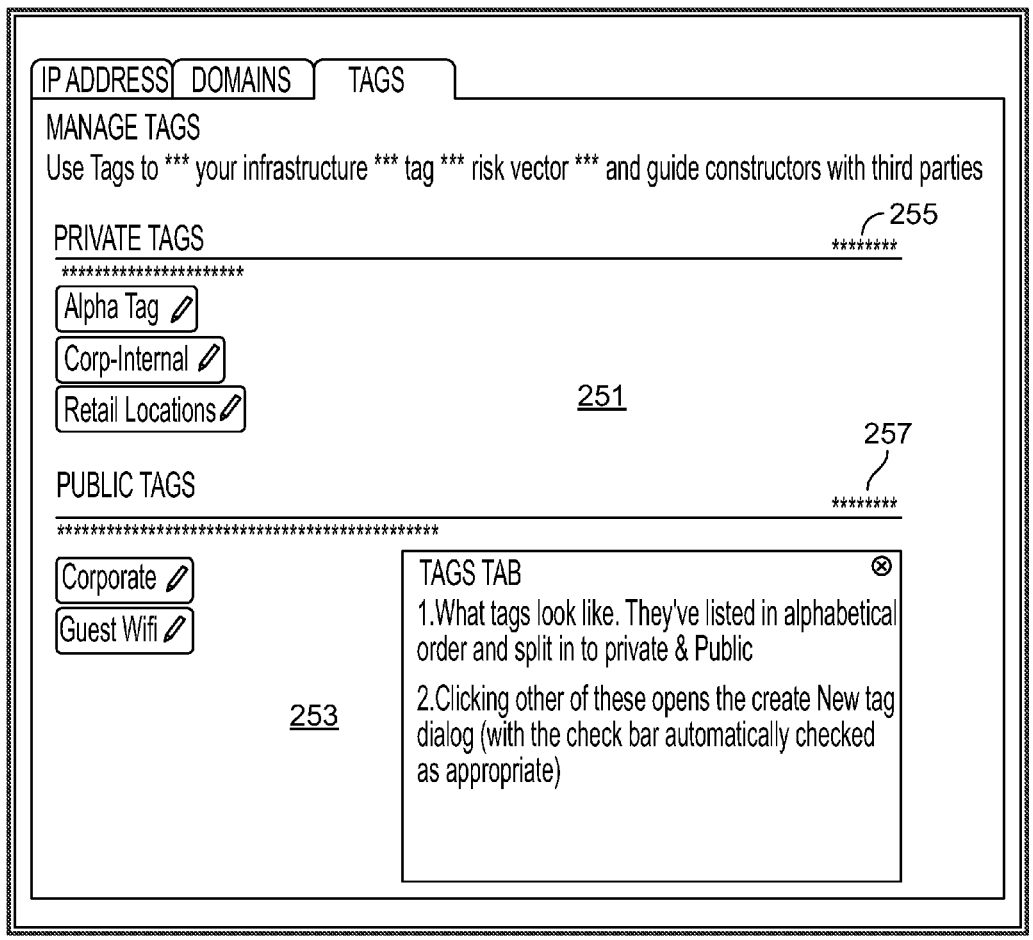

When the user invokes the link "Manage Tags" in the dialog box of FIG. 6 (or when the "Tags" tab is invoked), the user is taken to a "Manage Tags" page shown in FIG. 10. Existing private tags and existing public tags are listed in separate sections 251 and 253. The user can create new private and public tags by invoking the links 255 and 257 which lead to the "create New tags" dialog box discussed earlier with the public checkbox pre-populated appropriately.

Figure 11A:
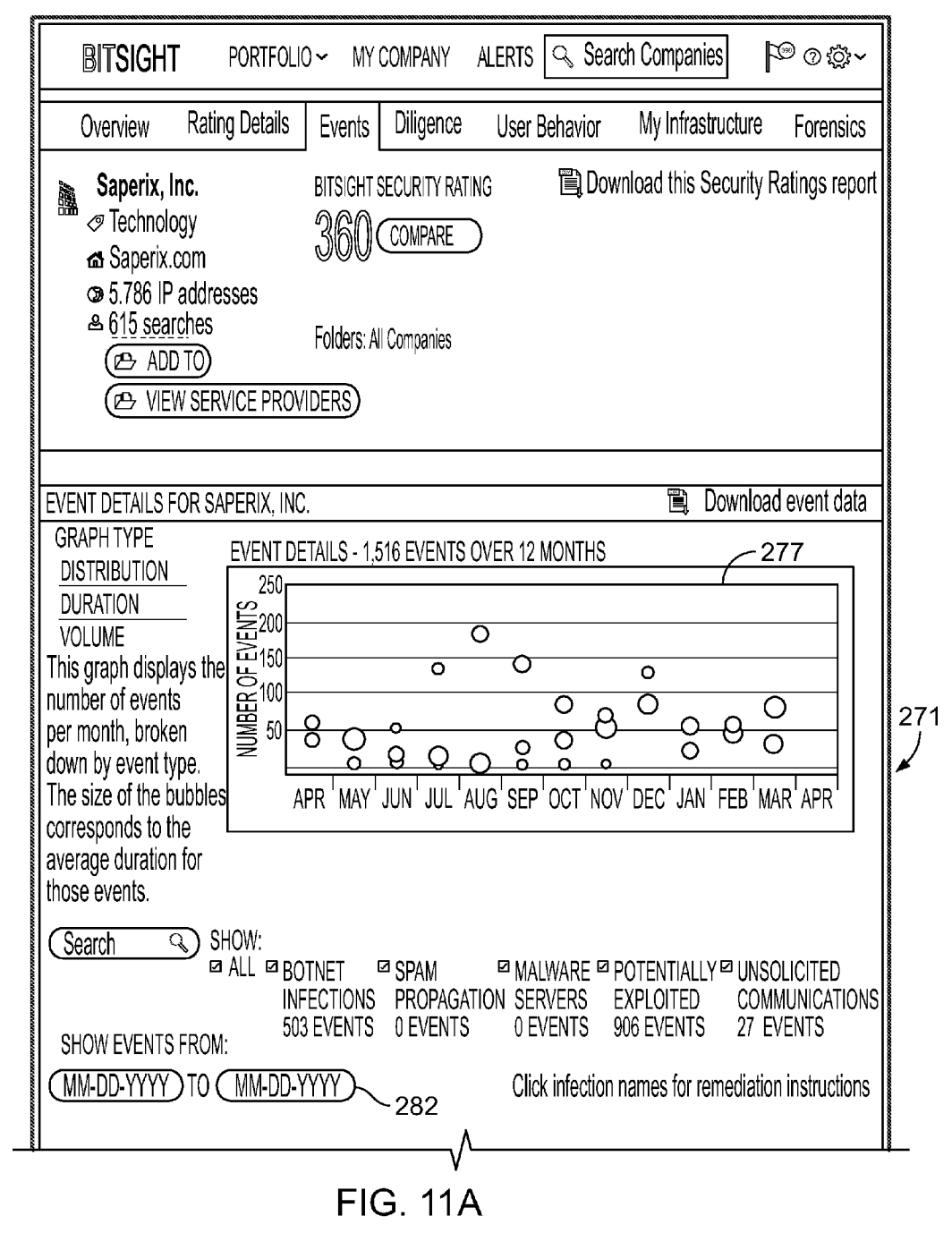

As shown in FIG. 11A, when the "Events" tab of FIG. 4 is invoked an event details page is displayed in which the lower panel 271 presents information about events that have occurred with respect to identified IP addresses, shown one IP address per row of the table. As shown in FIG. 11B, each row of the table identifies the type of event 273, the IP address, the start date and end date of the event, the number of days during which the event occurred, certain details such as the as the type of infection or name of the botnet, and a details link 275 that can be invoked to display more details. Applicable tags are also shown in each row.

Above the table in FIG. 11A, a bubble graph 277 presents a visualization of month by month events by type with the types and their volumes identified by color-coded bubbles. The size of each bubble corresponds to the average duration of the events that it represents. The graph shown in this figure represents the distribution of events over time. The user can control the data range using the controls 282 and can invoke a "Filter by tags" feature.

Figure 12:
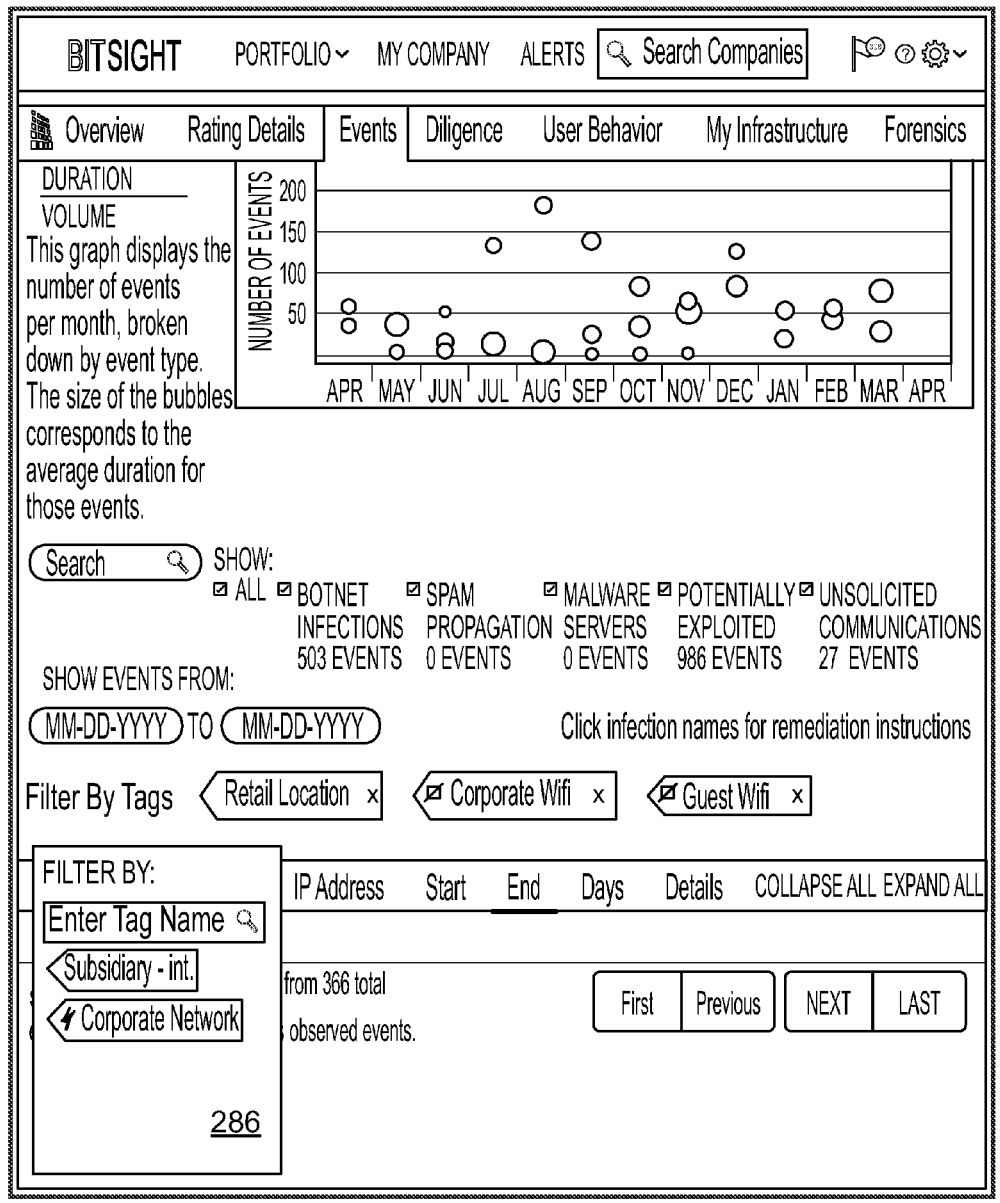

As shown in FIG. 12, the "Filter By Tags" feature is also applicable in the event details page and is presented in a dialog box 286 in which the user can enter a tag name and click tags that are to serve as the criteria for filtering. Tags that are active in controlling the filtering are displayed to the right of the "Filter By Tags" link.

Figure 13A:
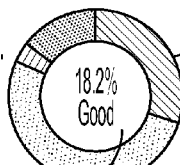
Figure 15E:
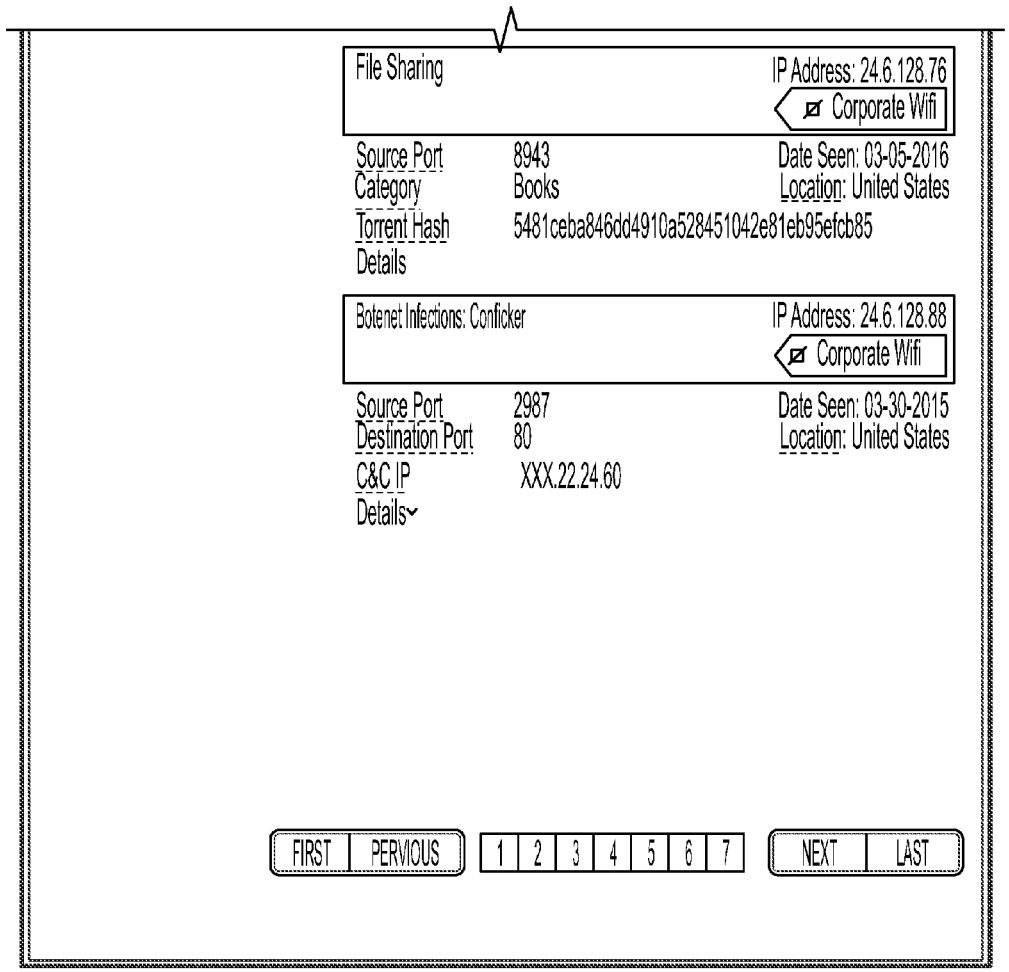

As shown in FIG. 13A, when the "Diligence" tab 288 is invoked, the bottom part of the presented page is replaced by a table 290 each of the rows 292 of which reports on an event, as shown in FIGS. 13B-13C. Each row identifies the dates when the event was first seen and last seen, a checkmark indicating whether the event has affected the grading of the entity (explained below), the IP address of the host or the domain name, the type of event, the grade assigned to the event, details about the event, and an icon 294 that can be invoked to see more detail. When a tag has been applied to the host, that tag 296 is displayed in that row underneath the IP address. When one or more events have occurred with respect to diligence, an additional link appears with the row of the related domain or IP address. Invoking the link causes additional information about the events to be presented.

Above the table in FIG. 13A diligence grading information is presented. A set of buttons 300 enables the user to select a diligence category or to select all categories 302 as has been done for this particular page. Grades 304 are displayed for each of the categories related to diligence. The grades vary from A to F in a grading system similar to typical school grading. A grade distribution graphic 306 summarizes the grade distribution among the grades A through F and shows a composite grade 308. In FIG. 13B, in table 290, the rows have been filtered to show only those that impact grades.

Invoking the "User Behavior" tab on FIG. 4 causes the page shown in FIG. 14A to be presented. The upper part of the details panel indicates the grade 336 of the entity on the subject of User Behavior-File Sharing (in this case an F grade indicating that the entity is in the bottom 10% of all companies covered by the security risk system. A bar chart 338 identifies types of content that are the subjects of the file sharing and for each illustrates the number of filing sharing events, the number of unique torrents, and the number of unique IP addresses involved. As shown in FIG. 14B, a table 340 is presented in which each row 341 identifies an event involving file sharing user behavior. Each row identifies the file sharing category and any tag associated with it, the associated IP address, start time, end time, whether the event impacted the grade shown above, the number of days involved, and whether the event was whitelisted. A row of filtering controls 342 above the table indicates that the entries have been filtered 344 to include only the events that impact the grade.

FIGS. 15A-E contains a filtered presentation of forensics. The forensics view shows more details about the evidence that was collected and that has been summarized or analyzed in the other "event" and "diligence" views. The data shown in the forensics view is useful to a network administrator or IT security administrator to remediate any issues.

Figure 16B:
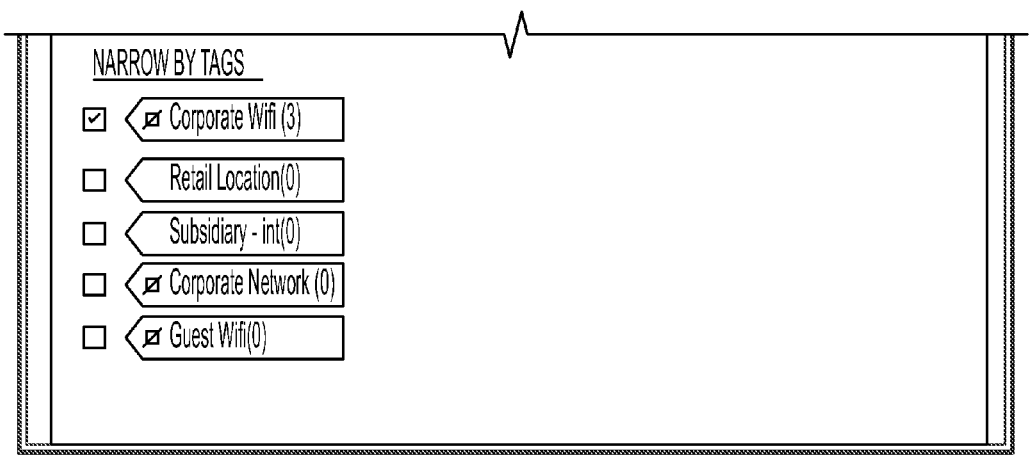

As shown in FIGS. 16A-16B, the "Forensics" page can be filtered to reduce the number of items displayed and to focus them in a direction of interest to the user. The filters can include a time period filter 320 (not active in this figure), a risk vector filter 322 (also not active in this figure), and a tag filter 324 (here set on the Corporate WiFi tag only). Each item 326 displayed in the filtered forensics page identifies the type of forensics item 328, the IP address involved 330, a reminder of the tag 332 that is the subject of the tag filter, the date seen, the location, and other key information such as the source port. Additional details can be seen by invoking the "Details" link.

In some of the examples discussed above, a user who is an agent affiliated with an entity is able to make annotations for security subjects belonging to that entity. In some implementations, tags also may be added to security subjects belonging to entities unaffiliated with the annotator. These would normally only be viewable by the annotator and any observers associated with the same entity as the annotator. Such a feature may be useful, for example, when a user, while investigating problems in one of their partner companies discovers information about that company and wants to use the annotation platform to record that information.

Although much of the discussion of our example has focused on security subjects in the form of IP addresses, CIDRs, and subnets, we have also mentioned and shown similar features with respect to domain names, including annotations of them. It will be apparent that the application of the features of the annotation system can apply as broadly and richly to domains as they do to IP address assets.

The annotations platform can serve a wide variety of purposes and use cases. Among the use cases are the following: An IT security operations employee of an entity may want to be able to quickly sort events according to specific infrastructure contexts in order to be able to better prioritize actions to solve problems or to assign for action by a responsible team. A risk security manager may want to be able to assign to each event an infrastructure context so that the security operations people can quickly sort out the events that are more relevant to them. For a company that is subject to audit or evaluation, an externally facing IT or security manager may want to be able to guide the conversation about events by identifying critical networks versus non-critical networks in the infrastructure of his entity. An external consumer of a report or rating of a target entity provided by a security risk system (e.g., a security or IT or risk manager) may find it helpful to see tags to understand the severity of events and the footprint of the target entity.

Other implementations are within the scope of the following claims.

The invention claimed is:

1. A computer-implemented method comprising:
   by a computer, acquiring and storing information indicative of security risks associated with security subjects and with entities to which the security subjects belong,
   by the computer, analyzing the stored information to derive security indicators for the entities,
   by the computer, presenting security information including the security indicators for the entities and security information for the security subjects, the security information for the security subjects including human-supplied annotations entered via an input device by an individual with specialized knowledge of the security subjects, and
   by the computer, managing the annotations based on communications from a user, wherein the annotations comprise tags based at least in part on the individual's specialized knowledge of the security subjects wherein managing the annotations comprises curating, screening, editing, or monitoring the annotations and managing permissions to view or create annotations.

2. The method of claim 1 in which the security subjects comprise IP addresses.

3. The method of claim 2 in which the IP addresses comprise blocks of IP addresses that conform to Classless Inter-Domain Routing.

4. The method of claim 1 in which the entities own, control, or manage the IP addresses that belong to them.

5. The method of claim 1 in which the security subjects comprise domains.

6. The method of claim 5 in which the entities own, control, or manage the domains that belong to them.

7. The method of claim 1 in which the annotations are specified by selection from an existing set of available tags.

8. The method of claim 1 in which the analyzing of the stored information comprises updating a stored entity map between entities and security subjects.

9. The method of claim 1 comprising, by computer, managing permissions of users based on relationships of users to entities to which the annotations relate.

10. The method of claim 1 in which the annotations describe characteristics of the security subjects that comprise at least one of a type, a location, a time period, a relationship with other security subjects, a relationship with an entity, or a combination of any two or more of them.

11. The method of claim 1 in which the annotations comprise groupings of security subjects.

12. The method of claim 11 in which the groupings comprise subnets.

13. The method of claim 1 in which the presenting to the users of the security information comprises managing the presenting based on the user's relationship with one or more of the entities.

14. The method of claim 13 in which at least some of the users are affiliated with corresponding entities and can add, alter, or remove annotations for the corresponding entities, can view public information for other entities, and cannot add, alter, or remove annotations for any other entities.

15. A computer-implemented method comprising:
by a computer, operating an annotation facility that enables an individual with specialized knowledge of security subjects via an input device in real-time to manually add, alter, or remove annotations indicative of security risks associated with respective security subjects or entities to which the technology assets belong, and
by the computer and through a communication network, presenting to a user information about security risks associated with security subjects and with entities to which the security subjects belong, the information about the security risks including the annotations,
the presenting of the information to the user including at least one of visually associating the annotations with the respective security subjects or entities, allowing the user to filter information that is being presented based on the annotations, and allowing authorized users to add, alter, or remove annotations in the annotation facility, wherein the annotations comprise tags based at least in part on the individual's specialized knowledge of the security subjects,
by the computer, managing the annotations, wherein managing the annotations comprises curating, screening, editing, or monitoring the annotations and managing permissions to view or create annotations.

16. The method of claim 15 in which the security subjects comprise IP addresses.

17. The method of claim 16 in which the IP addresses comprise blocks of IP addresses that conform to Classless Inter-Domain Routing.

18. The method of claim 15 in which the entities own, control, or manage the IP addresses that belong to them.

19. The method of claim 15 in which the security subjects comprise domains.

20. The method of claim 19 in which the entities own, control, or manage the domains that belong to them.

21. The method of claim 15 in which the annotations comprise tags specified by the users.

22. The method of claim 21 in which the annotations are specified by the users selecting from sets of available tags.

23. The method of claim 15 in which the annotations describe characteristics of the security subjects that comprise at least one of a type, a location, a time period, a relationship with other security subjects, a relationship with an entity, or a combination of any two or more of them.

24. The method of claim 15 in which the annotations comprise groupings of IP addresses.

25. The method of claim 24 in which the groupings comprise subnets.

26. The method of claim 15 in which the presenting to the users of the information about security risks comprises managing the presenting based on the user's relationship with one or more of the entities.

27. The method of claim 26 in which at least some of the users are affiliated with corresponding entities and can add, alter, or remove annotations for the corresponding entities, can view public information for other entities, and cannot add, alter, or remove annotations for any other entities.

28. The method of claim 15 in which the information presented to the users comprises information about at least one of events indicative of the security risks, information about diligence, information about behavior of users of the security subjects, or information about forensics.

29. A system comprising:
a computer configured to acquire and store information indicative of security risks associated with security subjects and with entities to which the security subjects belong,
the computer analyzing the stored information to derive security indicators for the entities,
the computer presenting security information including the security indicators for the entities and security information for security subjects, the security information for security subjects including annotations entered via an input device by an individual with specialized knowledge of the security subjects, and
the computer managing the annotations based on communications from a user, wherein the annotations comprise tags based at least in part on the individual's specialized knowledge of the security subjects, wherein managing the annotations comprises curating, screening, editing, or monitoring the annotations and managing permissions to view or create annotations.

* * * * *